US011392430B2

United States Patent
Lamb et al.

(10) Patent No.: US 11,392,430 B2
(45) Date of Patent: Jul. 19, 2022

(54) APPLICATION SESSION AND ENHANCEMENT FOR A WEARABLE ELECTRONIC DEVICE

(71) Applicant: Apple Inc., Cupertino, CA (US)

(72) Inventors: Mike Lamb, San jose, CA (US); Neil Desai, San Francisco, CA (US); Antony J. Dzeryn, Mountain View, CA (US); Greg Novick, San Francisco, CA (US); Kevin McAtee, Berkeley, CA (US); Ziv Wolkowicki, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/803,822

(22) Filed: Feb. 27, 2020

(65) Prior Publication Data

US 2020/0241935 A1    Jul. 30, 2020

Related U.S. Application Data

(63) Continuation of application No. 15/832,910, filed on Dec. 6, 2017, now Pat. No. 10,592,305.

(60) Provisional application No. 62/507,188, filed on May 16, 2017.

(51) Int. Cl.
*G06F 9/54* (2006.01)
*G06F 1/3234* (2019.01)
*G06F 9/48* (2006.01)
*G06F 1/3206* (2019.01)
*G06F 1/16* (2006.01)

(52) U.S. Cl.
CPC ............ *G06F 9/541* (2013.01); *G06F 1/3206* (2013.01); *G06F 1/3265* (2013.01); *G06F 9/485* (2013.01); *G06F 9/4843* (2013.01); *G06F 1/163* (2013.01)

(58) Field of Classification Search
None
See application file for complete search history.

(56) References Cited

U.S. PATENT DOCUMENTS

| 5,790,120 | A | 8/1998 | Lozares et al. | |
| 9,690,621 | B2 * | 6/2017 | Kim | G06F 9/4881 |
| 10,592,305 | B2 * | 3/2020 | Lamb | G06F 9/541 |
| 2007/0220294 | A1 * | 9/2007 | Lippett | G06F 15/80 |
| | | | | 713/320 |
| 2016/0066277 | A1 | 3/2016 | Yang et al. | |
| 2016/0240154 | A1 * | 8/2016 | Forutanpour | G06F 1/163 |

(Continued)

*Primary Examiner* — Umut Onat
(74) *Attorney, Agent, or Firm* — BakerHostetler

(57) ABSTRACT

One embodiment provides for a wearable electronic device comprising a display device, a memory device, and one or more processors to execute instructions stored in the memory device. The instructions cause the one or more processors to receive an interaction to transition an application to a front-most state on the wearable electronic device, receive a request to initiate an activity via the application in the front-most state, detect that the wearable electronic device has transitioned to a low power mode, and enable enhanced functionality for the application in the front-most state during the low power mode while the application is in the front-most stat. Enabling enhanced functionality for the application in the front-most state includes, for example, increasing an execution priority of the application while the application is in the front most state.

20 Claims, 16 Drawing Sheets

(56) References Cited

U.S. PATENT DOCUMENTS

2016/0364272 A1 12/2016 Hou et al.
2017/0132842 A1 5/2017 Morrison

* cited by examiner

APPLICATION SESSION AND ENHANCEMENT FOR A WEARABLE ELECTRONIC DEVICE

CROSS-REFERENCE

This application is a continuation of and claims priority to U.S. patent application Ser. No. 15/832,910, filed Dec. 6, 2017, now patented as U.S. Pat. No. 10,592,302 issued on Mar. 17, 2020, which also claims the priority of U.S. Provisional Patent Application No. 62/507,188, filed May 16, 2017, which is hereby incorporated herein by reference.

BACKGROUND OF THE DISCLOSURE

Portable electronic devices, including wearable electronic devices, have become increasingly popular, and the features and functionality provided by portable electronic devices continue to expand to meet the needs and expectations of many consumers. In addition to keeping time, uses may desire wearable electronic devices to be able to perform a variety of other operations including running software applications. A user may want to access different types of information, such as various aspects related to keeping time, or different application data points, in different contexts. It is therefore desirable to enable a user to access information through a user interface while keeping the user interface simple and intuitive to use.

SUMMARY OF THE DESCRIPTION

Embodiments described herein provide for a method of determining application display persistence on a wearable electronic device, the method comprising receiving an application programming interface (API) call from an application to perform an action on the wearable electronic device; beginning a session on the wearable electronic device in response to determining that the API call is associated with the beginning of a session; determining, based on the application, a persistence level to apply to the application; flagging the application associated with the session as persistent; and displaying a persistent application at a next activation of the wearable electronic device in place of a default application associated with the wearable electronic device.

One embodiment provides for a non-transitory machine readable medium storing instructions which, when executed by one or more processors of a wearable electronic device, cause the wearable electronic device to perform operations including receiving an interaction to transition an application to a front-most state on the wearable electronic device; receiving a request to initiate an activity via the front-most application; detecting that the wearable electronic device has transitioned to an inactive or screen-off state; and enabling enhanced functionality for the front-most application during the inactive or screen off state while the application is in the front-most state.

One embodiment provides for a data processing system on a wearable electronic device, the data processing system comprising one or more processors and a non-transitory machine-readable medium storing a set of instructions for execution by the one or more processors. The instructions can be configured to cause the one or more processors to receive a first application programming interface (API) call from an application to perform a first action on the wearable electronic device; begin a session on the wearable electronic device in response to a first determination that the first API call is associated with the beginning of a session; determine, based on the application, a persistence level to apply to the application; flag the application associated with the session as persistent; and display a persistent application at the next activation of the wearable electronic device in place of a default application associated with the wearable electronic device.

Other features of the present embodiments will be apparent from the accompanying drawings and from the detailed description, which follows.

BRIEF DESCRIPTION OF THE DRAWINGS

Embodiments of the present invention are illustrated by way of example, and not limitation, in the figures of the accompanying drawings in which reference numbers are indicative of origin figure, like references may indicate similar elements, and in which.

DETAILED DESCRIPTION

Figure 1B:
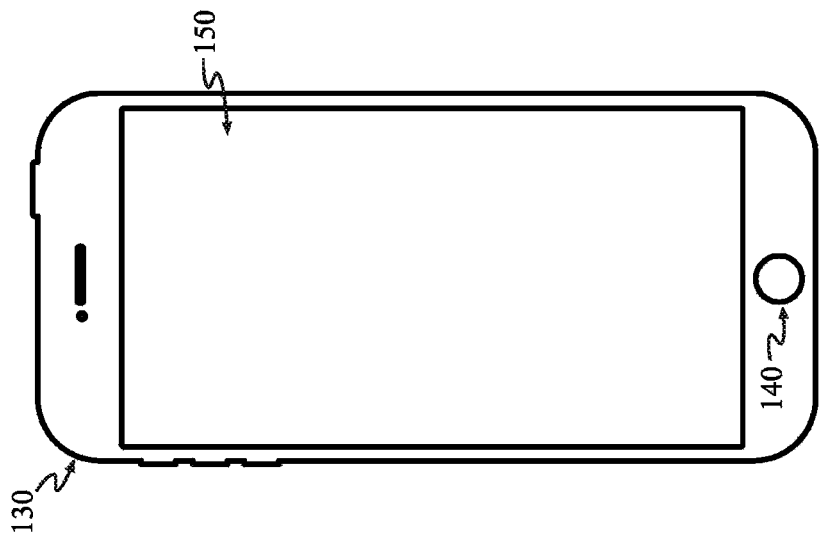
FIG. 1A-1B illustrates a wearable electronic device and a companion mobile electronic device, according to embodiments described herein.

Embodiments described herein provide a wearable electronic device having a primary interface that includes an internal display device and a touch input interface. The wearable electronic may have a low power mode in which the display and/or other components are inactive or disabled. A button press, touch input, or a motion gesture, such as wrist action, can be used to activate the display and enable the user to interact with the wearable electronic device. While the wearable electronic device can execute multiple applications simultaneously, generally only a single application is the primary (e.g., front-most) application on the display device of the wearable electronic device. To enable an intuitive interface for the wearable electronic device, the specific application that is displayed when the user activates the wearable electronic device can be determined in a context sensitive manner in which the application presented to the user upon activation can vary based on the circumstances of use for the device.

In one embodiment, applications executing on a wearable electronic device can be tagged as an enhanced application. In such embodiments, enhanced applications may be allowed additional access to compute and network resources while the wearable electronic device is in a low power or inactive state. In one embodiment an application is tagged as an enhanced application when the application will be the application that is the front-most application while the device is in a screen off or low power state. In such scenario, network connectivity and/or companion application communication for an enhanced application is not limited. In one embodiment, whether an application is the front-most application during a screen off or low power scenario can be based in part on the sticky status of the application. While an application is considered sticky (e.g., semi-sticky, sticky, super-sticky), such that the application will be presented as the front-most application upon activity resumption on the wearable electronic device, the application can be considered an enhanced application that will be allowed to access system resources for a period of time.

Reference in the specification to "one embodiment" or "an embodiment" means that a feature, structure, or characteristic described in conjunction with the embodiment can be included in at least one embodiment of the invention. The appearances of the phrase "in one embodiment" in various places in the specification do not necessarily all refer to the same embodiment.

The processes depicted in the figures that follow are performed by processing logic that comprises hardware (e.g. circuitry, dedicated logic, etc.), software (as instructions on a non-transitory machine-readable storage medium), or a combination of both hardware and software. Although the processes are described below in terms of some sequential operations, it should be appreciated that some of the operations described may be performed in a different order. Moreover, some operations may be performed in parallel rather than sequentially.

In the figures and description to follow, reference numbers are indicative of the figure in which the referenced element is introduced, such that an element having a reference number of N00 is first introduced in FIG. N. For example, an element having a reference number between 100 and 199 is first shown in FIG. 1, while an element having a reference number between 200 and 299 is first shown in FIG. 2, etc. Within a description of a given figure, previously introduced elements may or may not be referenced.

Exemplary Wearable Electronic Device

Figure 1A:
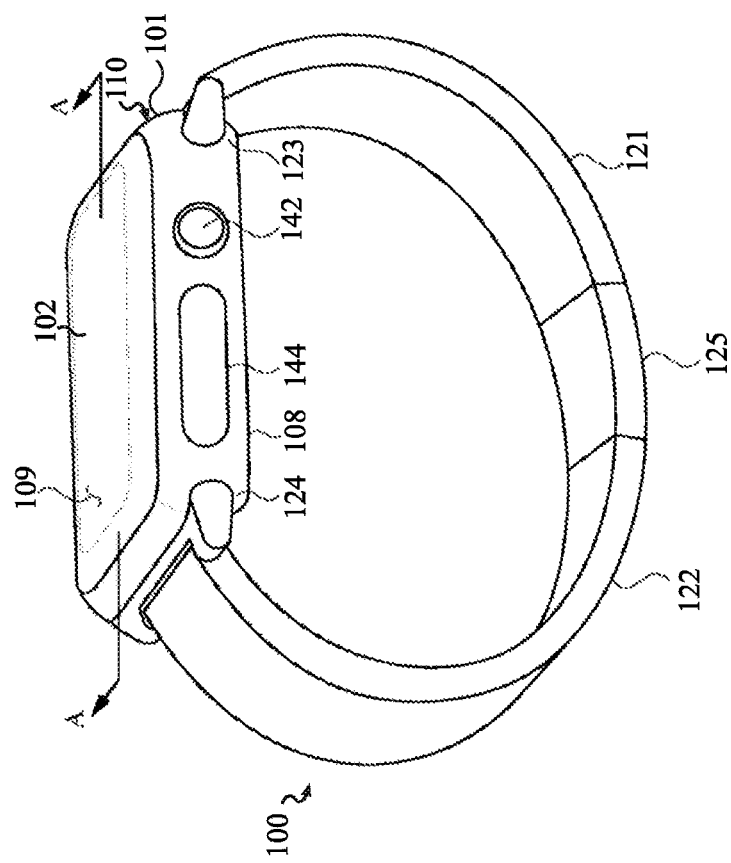

FIG. 1A-1B illustrates a wearable electronic device and a companion mobile electronic device, according to embodiments described herein. FIG. 1A illustrates a wearable electronic device in the form of a wristwatch device. FIG. 1B illustrates an exemplary mobile electronic device in the form of a smartphone device. Although specific examples are shown, embodiments described herein are applicable to additional electronic devices. For example, exemplary wearable electronic devices include various forms of time keeping devices, electronic or computerized glasses, sports related devices, pedometers, and or health and medical devices. Exemplary mobile electronic devices include tablet computers, navigation devices, and may also include laptop computers.

As shown in FIG. 1A, one embodiment provides a wearable electronic device 100 that includes a device body 110 that can be attached to a wrist of a user using a band assembly 120. The exterior surface of the device body 110 is defined, in part, by the exterior surface of a housing 101 and the exterior surface of a cover 109. The device body 110 is substantially rectangular with round or curved side portions, although other shapes and/or designs can be implemented. The outer surfaces of the cover 109 and the housing 101 coincide at a joint interface and cooperate to form a continuous contoured surface. The continuous contoured surface may have a constant radius and may be tangent to a flat middle portion of the cover 109 and/or a flat bottom portion of the housing 101. In some embodiments, the cover 109 has substantially the same shape as a flat bottom portion and at least a portion of the curved side portions of the housing 101. The housing 101 may be formed from a variety of materials, including, without limitation plastic, glass, ceramics, fiber composites, metal (e.g., stainless steel, aluminum, magnesium), other suitable materials, or a combination of these materials. Further, the housing 101 may include a surface treatment or coating, which may be formed from a variety of materials, including, without limitation aluminum, steel, gold, silver and other metals, metal alloys, ceramics, wood, plastics, glasses, and the like.

The illustrated wearable electronic device 100 may be referred to herein as a wearable device, a device, an electronic wristwatch, or an electronic watch. While these terms may be used with respect to certain embodiments, the functionality provided by the illustrated electronic wearable device 100 may be substantially greater than or vary with respect to many traditional electronic watches or timekeeping devices.

The wearable electronic device 100 includes a display 102 that is disposed at least partially within an opening or cavity defined within a top portion of the housing 101 of the device body 110. The display may be formed from a liquid crystal display (LCD), organic light emitting diode (OLED) display, organic electroluminescence (OEL) display, or other type of display device. The display 102 may be used to present visual information to the user and may be operated in accordance with one or more display modes or the software applications being executed on the device 100. By way of example, the display may be configured to present the current time and date similar to a traditional watch or timepiece. The display may also present a variety of other visual information that may correspond to or be produced using one of the other modules in the wearable electronic device 100. For example, the display 102 may be configured to display one of a variety of notification messages, which can be generated based on data received from the one or more sensors, the wireless communication system, or other subsystem of the wearable electronic device 100. The display 102 may also be configured to present visual information or data that is based on the output of one or more sensor outputs. The display 102 can also provide status or information related to a wireless charging process or battery power. The display 102 can also present visual output or information related to media being produced using a speaker or acoustic module of the wearable electronic device 100. Accordingly, a variety of other types of visual output or information may be presented using the display.

In the current example, the display 102 includes or is integrated with a cover 109 that helps to protect the display from physical impact or scratches. In the field of wearable devices, the cover 109 may also be referred to generically as a crystal or cover glass, regardless of the material that is used to form the cover 109. In some cases, the cover 109 is formed from a sheet or block of sapphire material. Sapphire may provide superior optical and surface hardness properties as compared to other materials. In some cases, the sapphire material has a hardness of approximately 9 on the Mohs scale. In alternative embodiments, the cover 109 is formed from a glass, polycarbonate, or other optically transparent material. The cover 109 may also be coated with one or more optical or mechanical enhancing materials or surface treatments. For example, interior and/or exterior surfaces of the cover 109 may be coated with an anti-reflective (AR), oleophobic or other coating to enhance the visible or functional properties of the display. In some cases, the cover 109 may be configured to cooperate with an antenna used to facilitate wireless communication with an external device.

The cover 109 is formed from a transparent or semi-transparent material and, when assembled has an external surface and an internal surface. The cover 109 is disposed above the display and encloses a cavity or opening formed in the top portion of the housing 101. In some embodiments, the external surface of the cover 109 cooperates with the external surface of the housing to form a substantially continuous external peripheral surface of the electronic device. The external surface of the cover 109 has a flat middle portion at the center of the cover, which extends outwardly. The cover 109 can also include a curved edge portion that emanates from and surrounds the flat middle portion and extends outwardly to an edge at the side of the cover 109. In some embodiments, the cover 109 also includes an opaque mask disposed relative to the internal surface of the transparent cover. The opaque mask may correspond to or otherwise define the viewable area of the display 102. The mask may have an outer boundary that is located proximate the edge of the side of the cover 109 and has an inner boundary located within the curved edge portion of the cover 109.

In some instances, the cover 109 is disposed relative to a touch sensor, which may be integrated with the display 102 or other element of the wearable electronic device 100. The touch sensor can be formed from one or more capacitive sensor electrodes or nodes that are configured to detect the presence and/or location of an object or the user's finger that is touching or nearly touching the surface of the display. In some cases, the touch sensor includes an array of sensing nodes formed in accordance with a mutual capacitance sensing scheme. Alternatively or additionally, the touch sensor may include one or more self-capacitive nodes or electrodes that are configured to detect a discharge of electrical current or charge when an object, such as a user's finger, contacts or nearly contacts a surface of the housing 101 or other surface of the wearable electronic device 100. Other types of electronically sensing nodes, including resistive, inductive, or the like, may also be integrated into a surface of the wearable electronic device 100.

In some embodiments, the wearable electronic device 100 may also include a force sensor. The force sensor may be disposed relative to the display 102 or integrated with other elements of the wearable electronic device 100. In some cases, the force sensor includes one or more force sensing structures or force-sensing nodes for detecting and measuring the magnitude of a force or pressure due to a touch on a surface of the wearable electronic device 100. The force sensor may be formed from or implement one or more types of sensor configurations. For example, capacitive and/or strain based sensor configurations may be used alone or in combination to detect and measure the magnitude of a force or pressure due to a touch. As described in more detail below, a capacitive force sensor may be configured to detect the magnitude of a touch based on the displacement of a surface or element on the device. Additionally or alternatively, a strain-based force sensor may be configured to detect the magnitude of a touch based on the deflection.

As discussed above, the display, the touch sensor, and force sensor may be disposed within the housing 101. In this example, one or more buttons 144 and a crown 142 used to receive user input may also be disposed within or relative to the housing 101. Other types of user input, including for example, one or more dials, slides, or similar user input devices or mechanisms may also be disposed within or relative to the housing 101. The housing 101 can include various features for attaching and mounting the subassemblies and modules of the device 100. In particular, the housing 101 may have one or more openings for receiving the cover 109, the display, the force sensor, or other components. The housing 101 may also include one or more holes or openings for receiving the button 144 and crown 142 that are located around the perimeter of the wearable electronic device 100. In some embodiments, the housing 101 also includes internal features, such as bosses and threaded portions, that can be used to attach modules or components within the housing 101.

The wearable electronic device 100 may also include an ambient light sensor (ALS) that is configured to detect and measure changes in ambient lighting conditions. The ALS may include a photodiode and one or more optical elements or lenses for collecting light. An ALS may be located on an external facing surface that is less likely to be blocked when the device is worn or in use. The ALS may be used to adjust settings, including screen brightness and other visual output depending on the overall lighting conditions.

The housing 101 may also include one or more motion-sensing elements or devices for detecting motion of the wearable electronic device 100. For example, the wearable electronic device 100 may include one or more accelerometers that are configured to sense acceleration or changes in motion. Additionally or alternatively, the wearable electronic device 100 may include one or more gyroscopic sensors that are configured to detect changes in direction. In some cases, the one or more gyroscopic sensors may include a spinning mass that can be used to detect changes in angular velocity. Multiple motion-sensing elements may be used to detect motion along multiple directions or axes. The motion sensors may also be used to identify motion gestures. For example, the motion sensors can be used to detect an arm raise or the position of a user's body (within a predetermined confidence level of certainty). The one or more motion-sensing elements may be used to determine an orientation of the device relative to a known or fixed datum. For example, the device may include a compass and/or global positioning system (GPS) that can be used to identify an absolute position. The one or more motion sensing elements may then measure deviation or movement with respect to the absolute position to track movement of the device or the user wearing the device. In some implementations, the one or more motion-sensing elements are used to detect gross movement of the device or user. The gross movement may be used as a pedometer or activity meter, which may be tracked over time and used to calculate a health metric or other health-related information.

The housing 101 may also include one or more openings or orifices coupled to an acoustic module or speaker, which may include a speaker and/or a microphone subassembly. Although the housing 101 may include one or more openings or orifices, the housing 101 may still be substantially waterproof/water resistant and may be substantially impermeable to liquids. For example, the opening or orifice in the housing or enclosure may include a membrane or mesh that is substantially impermeable to liquid ingress. Additionally or alternatively, the geometry of the opening or orifice and other internal features of the housing 101 may be configured to reduce or impede the ingress of liquid or moisture into the device 100. In one example, the opening is formed from one or more orifices that are offset with respect to an internal acoustic chamber or cavity, which may prevent a direct path from the outside of the housing 101 into the acoustic module.

The wearable electronic device 100 includes a device body 110 that may be attached to a user's wrist using a band assembly. In the present example, the band assembly includes a first band strap 121 attached to a first receiving feature 123 and a second band strap 122 attached to a second receiving feature 124. In some embodiments, the first and second band straps 121, 122 include a lug feature that is configured to attach to the first and second receiving features 123, 124, respectively. The free ends of the band straps 121, 122 may be connected with a clasp 125.

The band straps 121, 122 are formed from a flexible or compliant material that may be specially configured for a particular application. The band straps 121, 122 may be formed from a variety of materials, including, for example, leather, woven textiles, or metallic mesh materials. The material and construction of the band straps 121, 122 may depend on the application. For example, the band straps 121, 122 may be formed from a woven textile material configured for exposure to impact and moisture typically associated with outdoor activities. In another example, the band straps 121, 122 may be formed from a metallic mesh material that may be configured to have a fine finish and construction that may be more appropriate for professional or social activities.

Similarly, the clasp 125 of the band assembly may be configured for a particular application or to work with a particular style of band. For example, if the band straps 121, 122 are formed from a metallic mesh material, the clasp 125 may include a magnetic clasp mechanism. In the present example, the device 100 is configured to be attached to the wrist of a user. However, in alternative embodiments, the device may be configured to be attached to the arm, leg or other body part of the user.

The housing 101 includes one or more features for attaching the band straps 121, 122. In the present example, the housing 101 includes a first receiving feature 123 and a second receiving feature 124 for attaching the first band strap 121 and the second band strap 122, respectively. In this example, the band straps 121, 122 include a lug portion that is adapted to mechanically engage with the receiving features 123, 124. The first receiving feature 123 and second receiving feature 124 may be integrally formed into the housing 101. In alternative embodiments, the receiving features may be formed from separate parts and may be attached to the housing 101 during manufacturing. In some embodiments, the receiving features 123, 124 may be configured to release the band straps 121, 122 from the device body 110 (e.g., the housing 101). For example, one or both of the receiving features 123, 124 may include a button or slide, which may be actuated by the user to release a corresponding band strap 121 and 122. One advantage of a releasable lug is that the user can swap between a variety of bands that may be specially configured for a particular use scenario. For example, some bands may be specially configured for sport or athletic activities and other bands may be configured for more formal or professional activities.

The wearable electronic device 100 may also include a rear cover 108 located on the rear-facing surface of the housing 101 of the device body 110. The rear cover 108 may improve the strength and/or scratch resistance of the surface of the wearable electronic device 100. For example, in some embodiments, the rear cover 108 may be formed from a sapphire sheet, zirconia, or alumina material having superior scratch resistance and surface finish qualities. In some cases, the sapphire material has a hardness greater than 1 on the Mohs scale. In some cases, the sapphire material has a hardness of approximately 9 on the Mohs scale. Due to the superior strength of the sapphire material, a cover glass formed from a sapphire sheet may be very thin. For example, the thickness of a sapphire cover sheet may be less 300 microns thick. In some cases, the thickness of a sapphire cover sheet may be less than 100 microns thick. In some cases, the thickness of a sapphire cover sheet may be less than 50 microns thick. In some embodiments, the rear cover 108 is contoured in shape. For example, the rear cover 108 may have a convex curved surface.

FIG. 1B illustrates a mobile electronic device 130 which may be a companion device of the wearable electronic device 100 of FIG. 1A. The illustrated mobile electronic device 130 includes a display 150 for providing an operating system or application graphical interface. In one embodiment the display 150 is a multi-function touch screen display configured to accept touch or electronic pen input from a user. The mobile electronic device 130 can include one or more processing units, one or more network or other communications interfaces, memory, and one or more communication buses for interconnecting these components. The mobile electronic device 130 can execute an operating system that facilitates the execution of applications within memory of the mobile electronic device 130. Application programs may include phone programs, e-mail programs, personal information management (PIM) programs, word processing programs, spreadsheet programs, Internet browser programs, messaging programs, and the like. One or more of the application programs can work on concert with application programs executing on the wearable electronic device 100. For example, launching an application program on the mobile electronic device 130 or interacting with the application program via the display 150 can launch an application or cause an action to be performed on the wearable electronic device 100. In one embodiment, interacting with an application on the mobile electronic device 130 can cause an associated application on the wearable electronic device 100 to become a front-most application. In embodiments described herein, the front-most application executing on the wearable electronic device 100 can be granted enhanced execution capabilities, even when the wearable electronic device 100 is in a lower-power or screen-off state.

Figure 2:
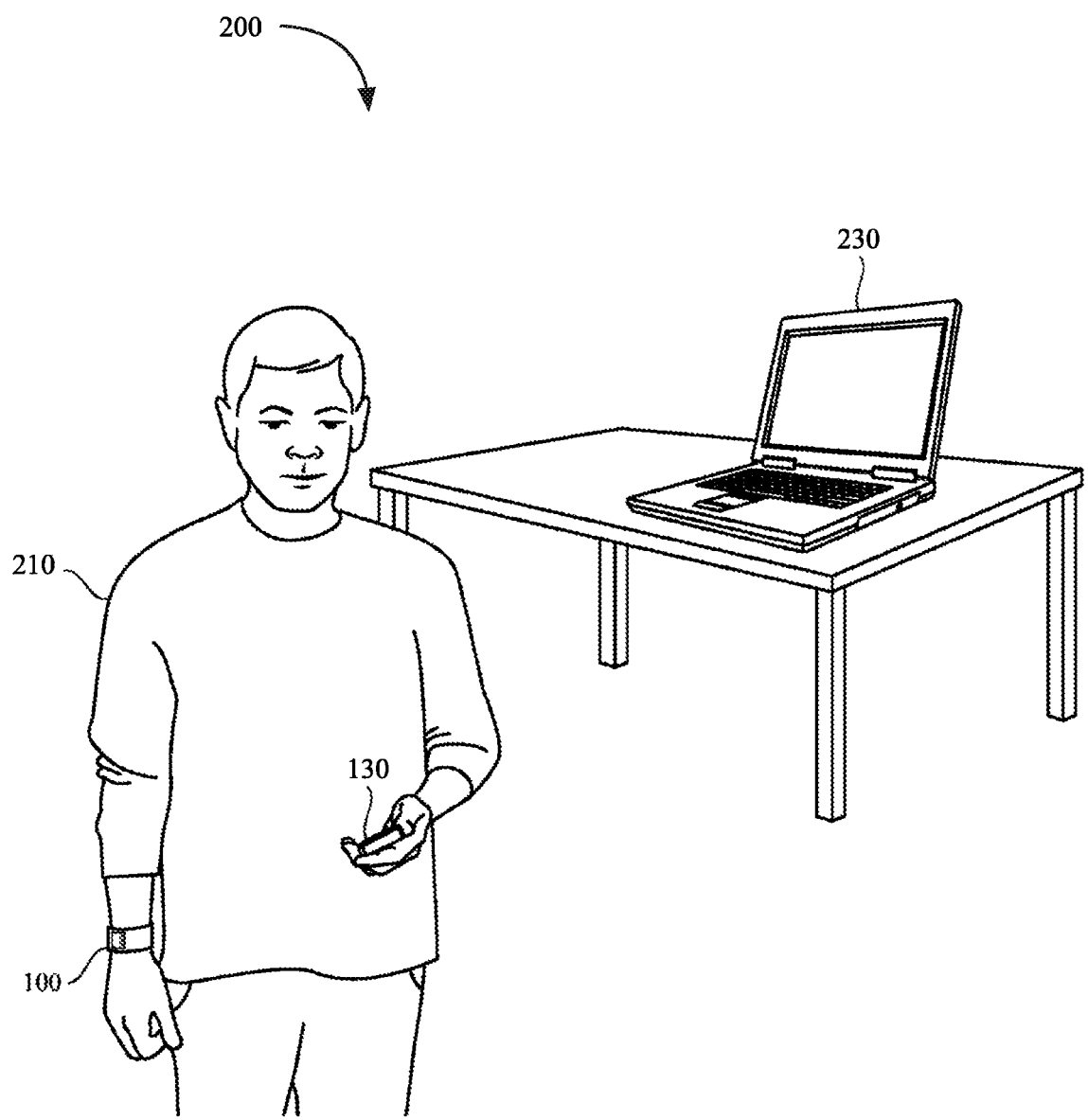
FIG. 2 depicts a wearable electronic device as part of a system of devices.

FIG. 2 depicts a wearable electronic device 100 as part of a system 200 of devices. The wearable electronic device 100 can communicate wirelessly with any number of devices in the system 200. In one embodiment the devices of the system 200 can include a mobile electronic device 130, such as a mobile phone, and/or a computing device 230 (e.g., laptop computer). The wearable electronic device 100 can communicate wirelessly with a number of additional devices, including but not limited to tablet computing devices, personal media players, televisions, networked home appliances, networked home controls, electronic systems in vehicles, and the like. Additionally, the wearable electronic device 100 may communicate wirelessly with any of a number of electronic accessories, including headset devices, portable speaker devices, portable microphone devices, display screens, and so on. Communication may be through a wireless connection using any technology mentioned herein. In one embodiment, communication can also be at least partially facilitated through a wired connection between a wearable electronic device any of the mentioned devices.

In some embodiments the wearable electronic device 100 may accept a variety of bands, straps, or other retention mechanisms (e.g., "bands") that may be removably connected to the electronic device by a feature formed into the band or band assembly. It should be appreciated that devices having other forms and/or functions may include similar recesses and may releasably mate with a lug and/or band incorporating a lug. In this fashion, a system of bands and devices may be envisioned, each of which is compatible with another. A single band may be used to connect to devices, as one further example; in such embodiments the band may include electrical interconnections that permit the two devices to transmit signals to one another and thereby interact with one another. Insofar as the electronic device 100 may connect either physically or through a data communication link with other computing devices, the combination of devices and bands may be thought of as an ecosystem having multiple parts that interact with one another, may intelligently communicate with one another, may share functionality and/or may substitute for one another in terms of operations, output, input and the like. For example, data communication between devices in an ecosystem may also permit the devices to share functionality. As one non-limiting example, electronic devices may share sensor data with one another to permit one device access to data it normally would not have, from a sensor it does not physically incorporate. Thus, any device 100, 130, 230 may draw on the abilities of other devices in the ecosystem to provide an enhanced and relatively seamless experience for a user 210. As another example, data may be passed from the computing device 230 through the mobile electronic device 130 to the wearable electronic device 100. This may be useful if the user 210 is wearing the wearable electronic device 100 but is not near the computer device when the computing device 230 wishes to notify the user or interact with the user in some fashion. For example, the computing device 230 may transmit a reminder or message to the wearable device 100 to gain the user's attention. As another example, the computing device 230 (or any other electronic device in the ecosystem) may transmit application or device state to the wearable device 100. Thus, for example, if an application operating on the computer needs the user's attention, it may be gained through an alert issued by the wearable device.

Front-Most Application Persistence

Embodiments described herein provide a wearable electronic device having a primary interface that includes an internal display device and a touch input interface. The wearable electronic device may have a low power mode in which the display and/or other components are inactive or disabled. A button press, touch input, or a motion gesture, such as wrist action, can be used to activate the display and enable the user to interact with the wearable electronic device. While the wearable electronic device can execute multiple applications simultaneously, generally only a single application is the primary (e.g., front-most) application on the display device of the wearable electronic device. To enable an intuitive interface for the wearable electronic device, the specific application that is displayed when the user activates the wearable electronic device can be determined in a context sensitive manner, such that the application that is presented to the user upon activation can vary based on the circumstances of use for the device.

In one embodiment the wearable electronic device is a watch device. In such embodiment, it may be generally presumed that upon activation the user will wish to view a watch face or another indication of the current time and/or date. However, the watch device can also execute applications that enable other time-related functionality, including but not limited to a stopwatch, a timer, or a calendar application. In one embodiment the watch device can also execute motion based applications, such as a turn-by-turn navigation application, a workout application, or a physical activity application. In one embodiment the watch device may also execute multimedia applications that enable media playback, media recording, or remote control of media playback via an associated mobile electronic device, such as a smartphone or tablet computing device. In one embodiment the watch device can be configured to execute third party programs by third party developers. The third-party applications can be loaded via an online application store (e.g., App Store) and/or loaded via a companion device, such as a smartphone device.

Whether to display a watch face or another application interface can be determined in a context sensitive manner. For example and in one embodiment, when a user activates an application on the watch device, the application can attain a level of persistence of display, such that the application can be considered 'sticky' for a period of time. Such sticky applications will be displayed upon the next activation of the watch device instead of the watch face. The application may remain sticky for a period of time until a timeout occurs. After the timeout period, the watch device will then display the watch face upon activation. In one embodiment, application stickiness and front-most status can be enabled or disabled based on activities in a companion application that executes on a companion device.

In some embodiments, differing levels of application stickiness can be enabled. One embodiment provides a watch device application execution environment having a semi-sticky status and a super-sticky status. An application having the semi-sticky status will be displayed on the display device in response to an activation (e.g., via a wrist raise gesture) until the application is explicitly dismissed. An application having the super-sticky status will be displayed on the display device in response to an activation even after the application has been explicitly dismissed. In one embodiment the super-sticky status can be maintained for an application for a period of time, after which the watch face will be displayed upon activation. One embodiment additionally provides for standard or regular sticky status in which an application will be displayed upon activation of the watch device until an idle timeout occurs. The idle timeout can be configured within the settings of the watch device and is reset if the user activates the device within the idle timeout period. In one embodiment the application developer can configure a longer idle timeout for an application.

Session Based Application Stickiness

In some embodiments, application stickiness can be configured based on whether an activity session has been enabled on the wearable electronic device. In one embodiment, system software on the wearable electronic device can begin or end activity sessions based on application programming interface (API) actions performed by an application executing on the wearable electronic device. During a session, the stickiness associated with an application can be modified. For example, an audio recording application can be configured to generally have a semi-sticky status, but will have a super sticky status during an audio recording session. Likewise, a telephone application can be configured to be super-sticky during a telephone call session. A navigation application can be configured to be super-sticky while turn-by-turn navigation is enabled.

First party applications provided by the manufacturer of the wearable electronic device can behave differently than third-party applications provided by third-party developers and made available on the wearable electronic device after the third-party application is downloaded via an application store. In one embodiment, the system of the wearable electronic device provides an API interface for third-party applications to declare the beginning and end of a session. In one embodiment, the ability to begin and end a session is reserved for first-party applications. In one embodiment the ability to begin and end a session is reserved to the system software of the wearable electronic device. The system software of the wearable electronic device can determine the beginning and end of a session based on API calls made by applications executing on the wearable electronic device.

In one embodiment a session can begin or end on a wearable electronic device based on activity performed on a companion application executing on an associated smart phone or tablet computing device. For example, a telephone call initiated on a smartphone device can initiate the beginning of a telephone call session on the wearable electronic device. During the telephone call, a telephone application on the wearable electronic device can be displayed upon activation of the wearable electronic device (e.g., via a wrist raise gesture) to display telephone call status information, such as a call duration or contact information of one or more participants within the telephone call. Additionally, a navigation session can begin on the wearable electronic device based on initiation of turn-by-turn navigation on the smartphone device. Additionally, a workout session can begin on the wearable electronic device based on initiation of workout within a workout application executing on the smartphone device. In one embodiment the system software of the wearable electronic device supports action specific sessions, such that each type of session is explicitly associated with the session activity. For example, during an audio recording session, the stickiness the audio recording application is adjusted while the stickiness of other types of applications are not adjusted.

Figure 3:
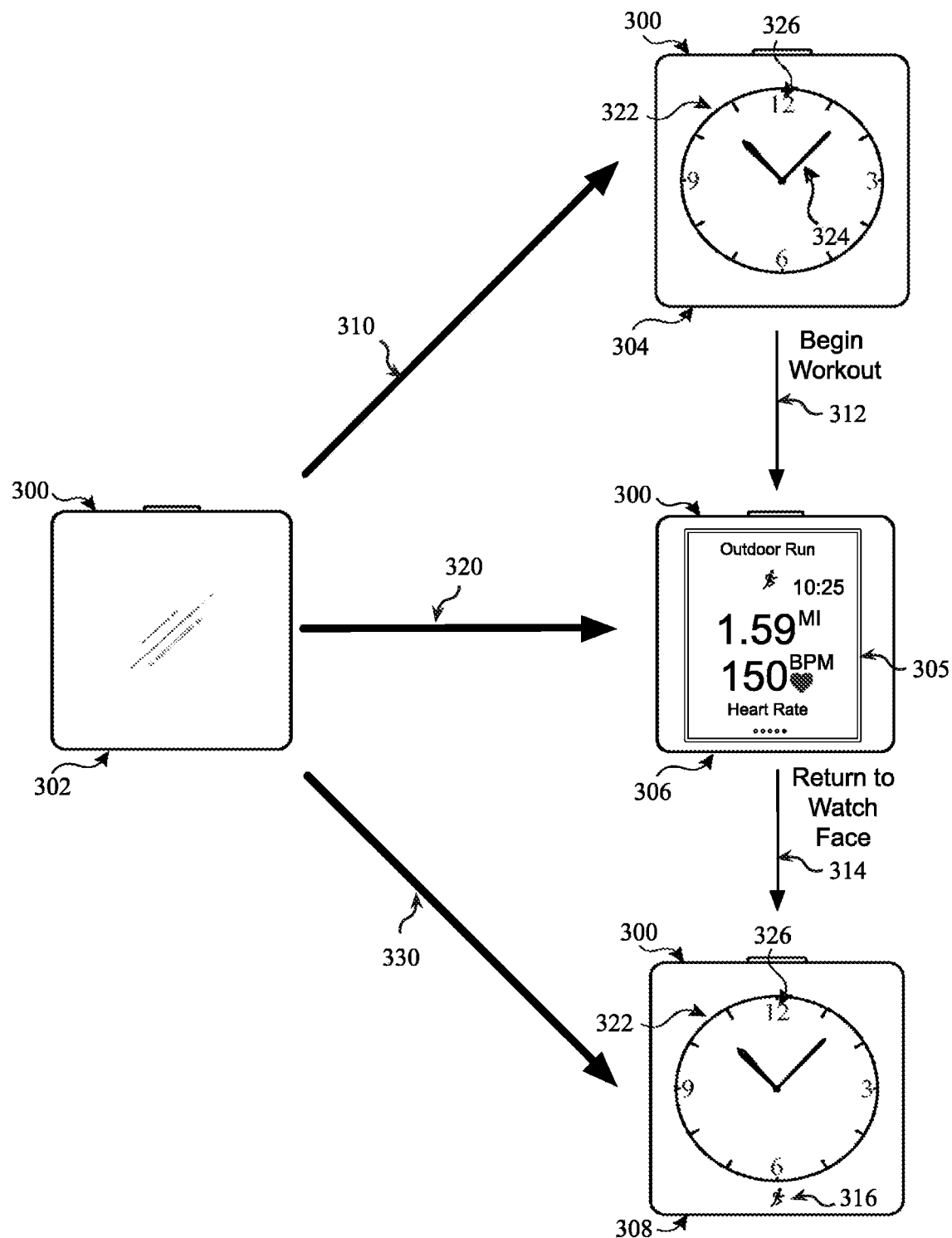
FIG. 3 depicts front-most application persistence on an electronic watch device, according to embodiments.

FIG. 3 depicts front-most application persistence on an electronic watch device 300, according to embodiments. The electronic watch device 300 is a version of the wearable electronic device 100 of FIG. 1 and FIG. 2. The electronic watch device 300 has a display that can display screen 302, which is a blank or disabled screen associated with a low power state of the electronic watch device 300. The electronic watch device 300 can enter a low power state when not in use, for example, in response to a user lowering their wrist after interacting with the watch device. In response to a detected motion gesture 310, such as a wrist raise gesture, the electronic watch device 300 can display screen 304, which is a watch face 322 by which the user can determine the current time. The details of the watch face 322 can vary and may be configurable by the user. The user can also select from multiple watch faces to display on the electronic watch device 300. In one embodiment the watch face 322 includes an hour and minute hand 324 to indicate the current hour and minute, as well as hour indicators (e.g., 12 o'clock indicator 326). In general, the watch face 322 may be displayed on the electronic watch device 300 by default in response to an activation gesture or button press.

In one embodiment the user can elect to begin (312) a workout, which will cause a workout status 305 to be displayed via screen 306. The workout can be initiated via a workout application on the electronic watch device 300 or via a companion workout application on an associated electronic device, such as a smartphone device. The API calls to begin the workout can indicate to the system software of the electronic watch device 300 to begin a workout session. Once the workout session begins, the workout application can be tagged as sticky and will attain a degree of persistence for the duration of the workout session. While the workout application is sticky, the workout status 305 of the ongoing workout session will be displayed when the electronic watch device 300 is activated, for example, in response to motion 320, which may be a wrist raise gesture. The level of stickiness of a given application during a session can vary based on the application and the associated session. In the case of a super sticky application, the application will be displayed even after the application is dismissed and an additional application is selected. For example, if a user were to begin (312) a workout on a companion application while screen 304 is displayed, the electronic watch device 300 can automatically switch to the workout status 305 on screen 306 and set the workout application as sticky. In the case of some super-sticky applications, including the workout application, the user can return (314) to the watch face while the workout session is active and screen 308 will be displayed, which shows the watch face 322 and a status indicator 316 that indicates to the user that a session, in this case a workout session, is in place. The status indicator 316 can be a selectable icon that can vary in appearance based on the type of active session. In one embodiment, for the duration of a session, the application associated with the session can be displayed in response to activating the electronic watch device 300. In one embodiment, after an idle timeout period, the watch face 322 can become the front-most application and will be displayed in response to a motion (e.g., motion 330). In such embodiment the selectable status indicator 316 can be displayed in conjunction with the watch face 322 for the duration of the session.

Exemplary applications and stickiness status are shown in Table 1.

TABLE 1

Session Based Application Stickiness

| Priority | Application | Idle Timeout | Stickiness During Session |
|---|---|---|---|
| 0 | Phone | | Super-Sticky |
| 1 | Map Navigation | default | Super-Sticky |
| 2 | Stopwatch | default | Semi-Sticky |
| 3 | Workout | default | Super-Sticky with Status Indicator |
| 4 | Audio Recording | | Super-Sticky with Status Indicator |
| 5 | Remote Control | default | Super-Sticky |
| 6 | Timer | default | Semi-Sticky |
| 7 | Media Playback Control | default | Semi-Sticky |
| 8 | Reserved | | |
| 9 | Third Party | default or extended session timeout | Regular-Sticky |

As illustrated in Table 1, the stickiness status of an application can range from semi-sticky, regular-sticky, or super-sticky depending on the application. In one embodiment telephone, map navigation, workout, audio recording, and remote control applications are super-sticky during an activity session associated with those applications. A stopwatch application, timer, and media playback control (e.g., "Now Playing") application can have semi-sticky status during an activity session associated with those applications. Third-party applications can each be assigned a regular-sticky status in which the third-party application is sticky during a session until an idle timeout period occurs. The idle timeout period for third-party applications during a session can be the default timeout period for the wearable electronic device or, in one embodiment, may be extended to an extended session timeout by an application developer. The duration of the extended session timeout can vary. For example and in one embodiment, the extended session timeout can be extended to up to eight minutes.

One or more applications can present a watch face status indicator during a session, such as status indicator 316, such that should a user select a watch face to be presented as front-most during the session, a selectable activity indicator will be displayed on the watch face to enable the user to quickly return to the application associated with the session. While the illustrated status indicator 316 is associated with a workout session, the status indicator that is presented can vary based on the session. During an audio recording session, the watch face can present a selectable microphone or recording icon on the watch face to enable the user to return to the audio recording application.

In one embodiment, stickiness of an application on the wearable electronic device can be related to activity that is performed via a companion application on an associated mobile electronic device, such as a smartphone or tablet device. For example, a workout application on the wearable electronic device can be brought front-most and made sticky in response to initiation of a workout via a workout application on a smartphone device. In one embodiment, initiating media playback on the mobile electronic device can cause the media playback control on the wearable electronic device to be made front-most and sticky. The media playback control can remain at least semi-sticky for a period of time after media playback ceases or while media playback is paused, such that the user can easily resume media playback via the wearable electronic device.

Figure 4A:
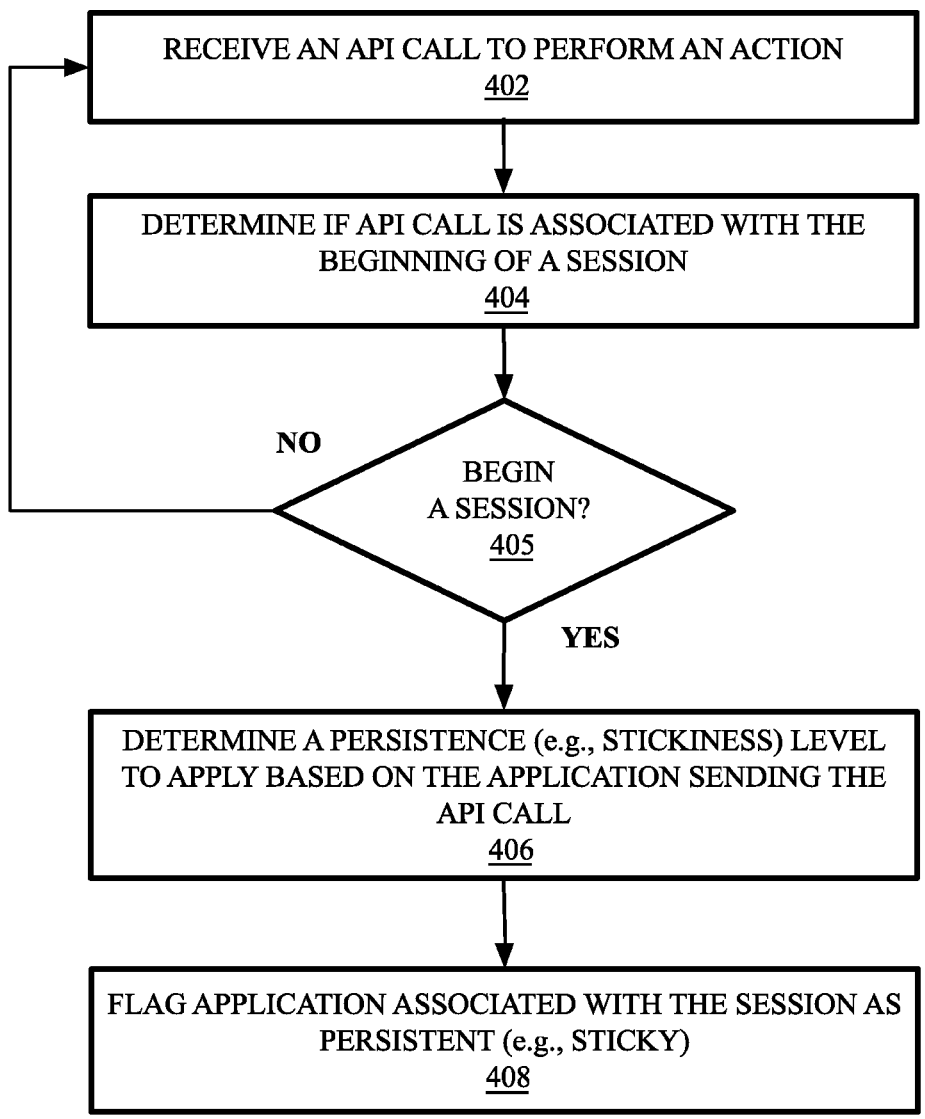
FIG. 4A-4C are flow diagrams illustrating operations to provide application stickiness and/or persistence on a wearable electronic device.
Figure 4B:
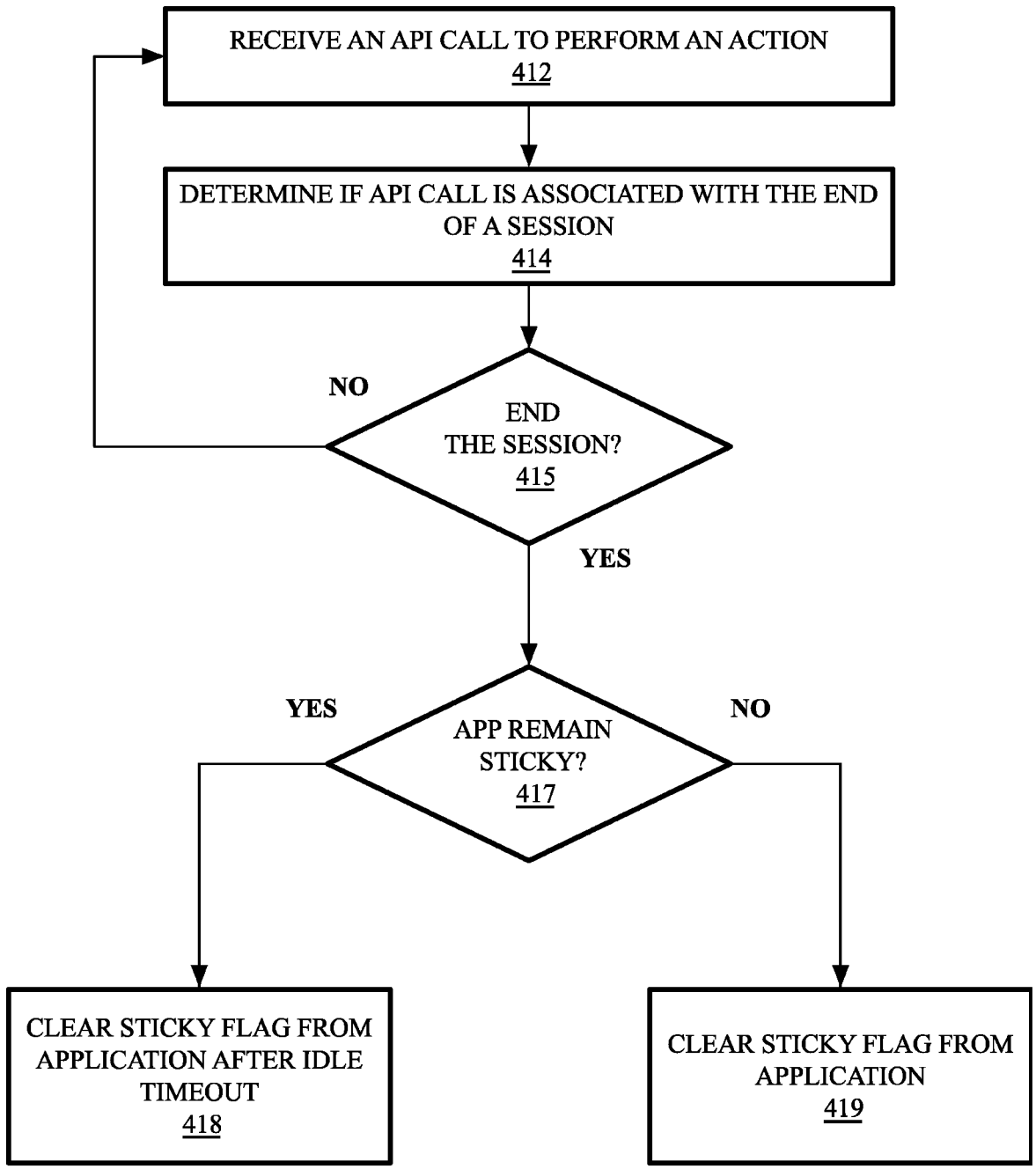
Figure 4C:
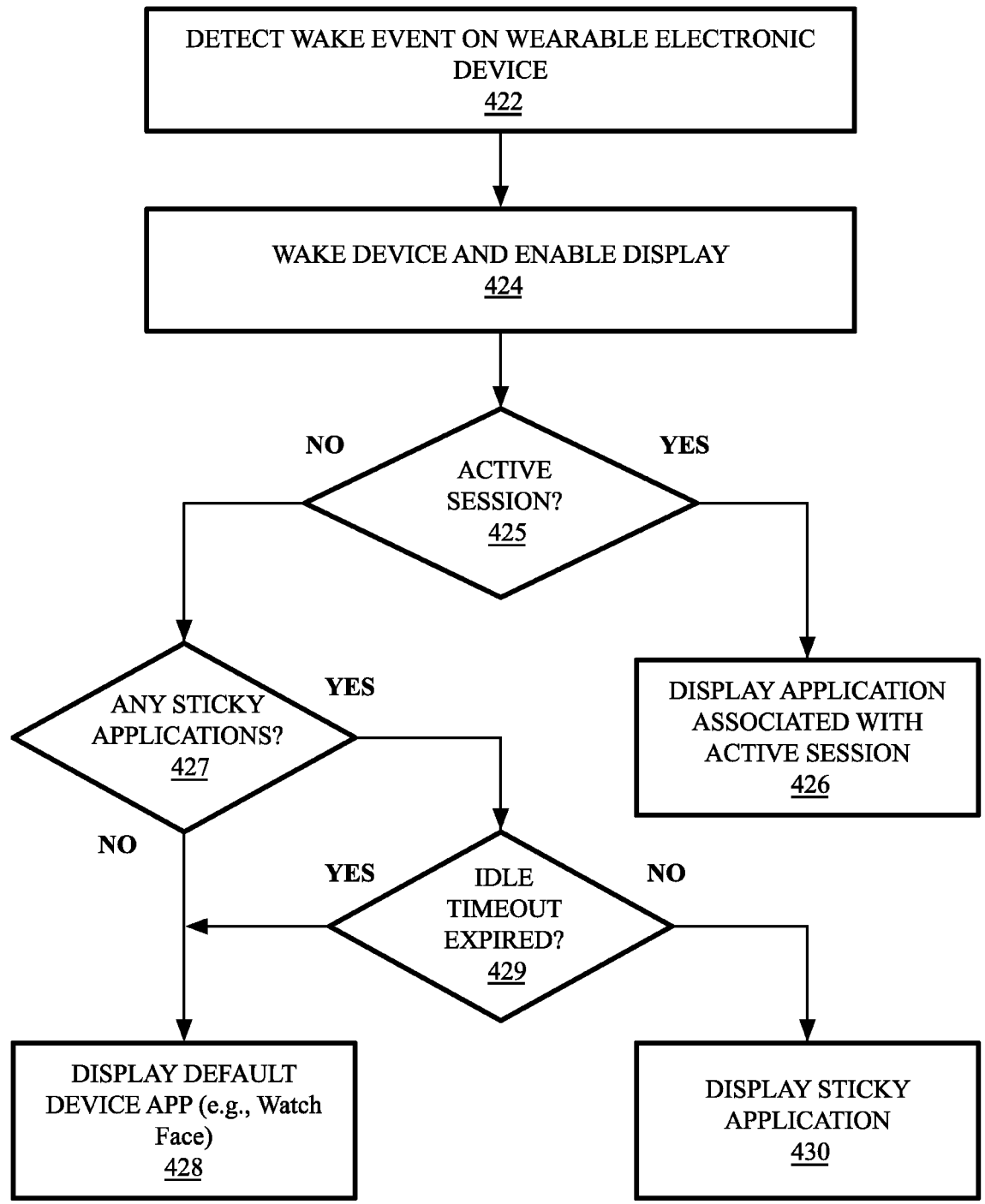

FIGS. 4A-4C are flow diagrams illustrating operations to provide application stickiness and/or persistence on a wearable electronic device. FIG. 4A illustrates operations for logic 400 to enable application stickiness. FIG. 4B illustrates operations for logic 410 to disable application stickiness. FIG. 4C illustrates operations for logic 420 to determine an application for display upon wake of the wearable electronic device. The logic 400, 410, 420 can be implemented via software within a wearable electronic device or electronic watch device as described herein.

As shown in FIG. 4A, logic 400 to enable application stickiness can receive an API call to perform an action, as shown at block 402. The API call to perform the action can be sent from an application executing on the wearable electronic device to the system software of the wearable electronic device. In one embodiment, the system software of the wearable electronic device provides an API interface for applications to declare the beginning and end of a session. In one embodiment, the API calls to begin and end a session are reserved for first-party applications. In one embodiment the ability to begin and end a session is reserved to the system software of the wearable electronic device. In such embodiment the system software will begin and end a session based on a determination of whether the API call is associated with the beginning of a session, as shown at block 404. Exemplary API calls associated with the beginning of a session include but are not limited to an API call to begin a telephone call, turn-by-turn navigation session, stopwatch or timing session, workout, audio recording session, or a media playback session. As shown at block 406, if the API call indicates to begin a session, as indicated at block 405, the logic 400 can determine a persistence (e.g., stickiness) level to apply based on the application sending the API call. Exemplary and non-limiting persistence or stickiness levels associated with a set of applications are shown in Table 1 above. If the API call is not associated with the beginning of a session at block 405, the logic 400 can return to receiving API calls at block 402. Otherwise, after determining a persistence level at block 406, the logic can flag the application associated with the session as persistent (e.g., sticky), as shown at block 408. In one embodiment, a persistence or stickiness level associated with the application can be included in the flag data that is applied to the application.

As shown at block 412, logic 410 to disable application stickiness can receive an API call to perform an action. The logic 410 can then determine if the API call is associated with the end of a session at block 414. Exemplary API calls associated with the end of a session include but are not limited to a call to end a workout, end a recording, or a call that indicates media playback has ceased (e.g., stopped, paused, etc.). If the logic 410 does not determine that the API call should end the session at block 415, the logic 410 can return to receiving API calls at block 412. Otherwise, the logic 410 can determine if the application should remain sticky after the session has ended. If the logic determines that the application should remain sticky at block 417, the logic 410 can bypass an immediate clear of the sticky flag and instead clear the sticky flag from the application after an idle timeout, as shown at block 418. For example and in one embodiment, after media playback is paused or stopped, a media playback session can end. After the media playback session ends the media playback control (e.g., "Now Playing") application can remain in at least a semi-persistent (e.g., semi-sticky) state until an idle timeout occurs. If the application is not to remain sticky after the session ends, the logic 410 can clear the sticky flag from the application at block 419.

As shown in FIG. 4C logic 420 to determine an application for display upon wake of the wearable electronic device can detect a wake event on a wearable electronic device at block 422. Where the wearable electronic device is an electronic watch device, the wake event can be a wrist raise gesture. The electronic watch device may also be activated via a button press or in response to a touch input received via a touch screen. For different types of wearable electronic devices, different inputs or gestures may be associated with wake events, as the techniques described herein are not limited to electronic watch devices and may also be applicable to other forms of wearable electronic devices.

In response to the wake event, the logic 420 can wake the device and enable a display on the device, as shown at block 424. The logic 420 can then determine if an active session is present on the device at block 425. If an active session is in place, the logic 420 can display the application associated with the active session. If no sessions are active at block 425, the logic 420 can determine if any applications are marked as sticky at block 427. If no applications are marked as sticky at block 427, the logic 420 can display a default device application at block 428, such as a watch face in the case of an electronic watch device.

If the logic 420 determines that a sticky or otherwise persistent application is present on the device at block 427, the logic 420 can determine if the idle timeout period for the sticky application has expired at block 429. If the idle timeout period has expired at block 429, the logic 420 can display the default device application at block 428. The idle timeout period can vary per application and can be a default idle timeout period, an extended idle timeout period, or a user-defined idle timeout period. The timer associated with the idle timeout period for an application can be reset each time the user activates the device within the idle timeout period. If the logic 420 determines at block 429 that the idle timeout period has not expired, the logic 420 can display the sticky application at block 430. In one embodiment, only a single application can be flagged as sticky. In one embodiment, multiple applications can have a sticky status and the application to be displayed can vary based on the level of stickiness associated with the application. In embodiments in which multiple applications may be flagged as sticky, one embodiment determines an application to display based on a priority associated with the application.

With additional reference to Table 1 above, it is noted that a priority can be associated with the various applications. In addition to being used as a general display priority, the indicated priorities are also indicative of an execution priority by which execution threads associated with the application are allotted processor time for execution when the wearable electronic device. In one embodiment the execution priority can be particularly important when the wearable electronic device is in an inactive state. When the electronic device is in an inactive state, such as an electronic watch device in a wrist down state, the amount of processor time allotted to applications for execution may be limited to reduce device power consumption. In one embodiment other components of the wearable electronic device, such as an application processor or one or more wireless radios, can be configured to enter a low power state when the wearable device is not in use. When the application processor and/or wireless radios are in a low power state, processing or communication operations for applications executing on the wearable electronic device may be limited. For example, an applications ability to download content over a network or to communicate with a companion application executing on a mobile electronic device (e.g., smartphone, tablet, etc.) can be limited when the wearable electronic device is in a low power state. The degree to which any given application is limited while the wearable electronic device is in a low power state can be determined, at least in part, based on the priority associated with the application.

Enhanced Application Runtime State

In one embodiment, applications executing on a wearable electronic device can be tagged as an enhanced application. In such embodiments, enhanced applications may be allowed additional access to compute and network resources while the wearable electronic device is in a low power or inactive state. In one embodiment an application is in an enhanced front-most state if the wearable electronic device is in a screen-off state and the application will be the application to be displayed upon activation of the wearable electronic device. For example, where the wearable electronic device is an electronic watch device, the enhanced front-most application is the application that will be displayed the next time the user raises their wrist to activate the electronic watch device. For enhanced front-most applications, network connectivity and/or companion application communication may not be limited as significantly as for other applications while the wearable electronic device is in an inactive state. In one embodiment whether an application is the front-most application during a screen off or low power scenario is based in part on the sticky status of the application. When an application is considered sticky, such that the application will be presented as the front-most application upon activity resumption on the wearable electronic device, the application can be considered an enhanced application that will be allowed to access system resources for a period of time when the wearable electronic device enters an inactive (e.g., wrist down) state.

Some embodiments provide additional enhancements to background applications that attempt to initiate background download activities. Such background applications can be given a guaranteed maximum initiation period in which the background download will be initiated within a specific period of time and may be initiated immediately if system resources are available. In one embodiment a runtime priority associated with background actions can be elevated to enable an application to more quickly complete background activities.

Figure 5A:
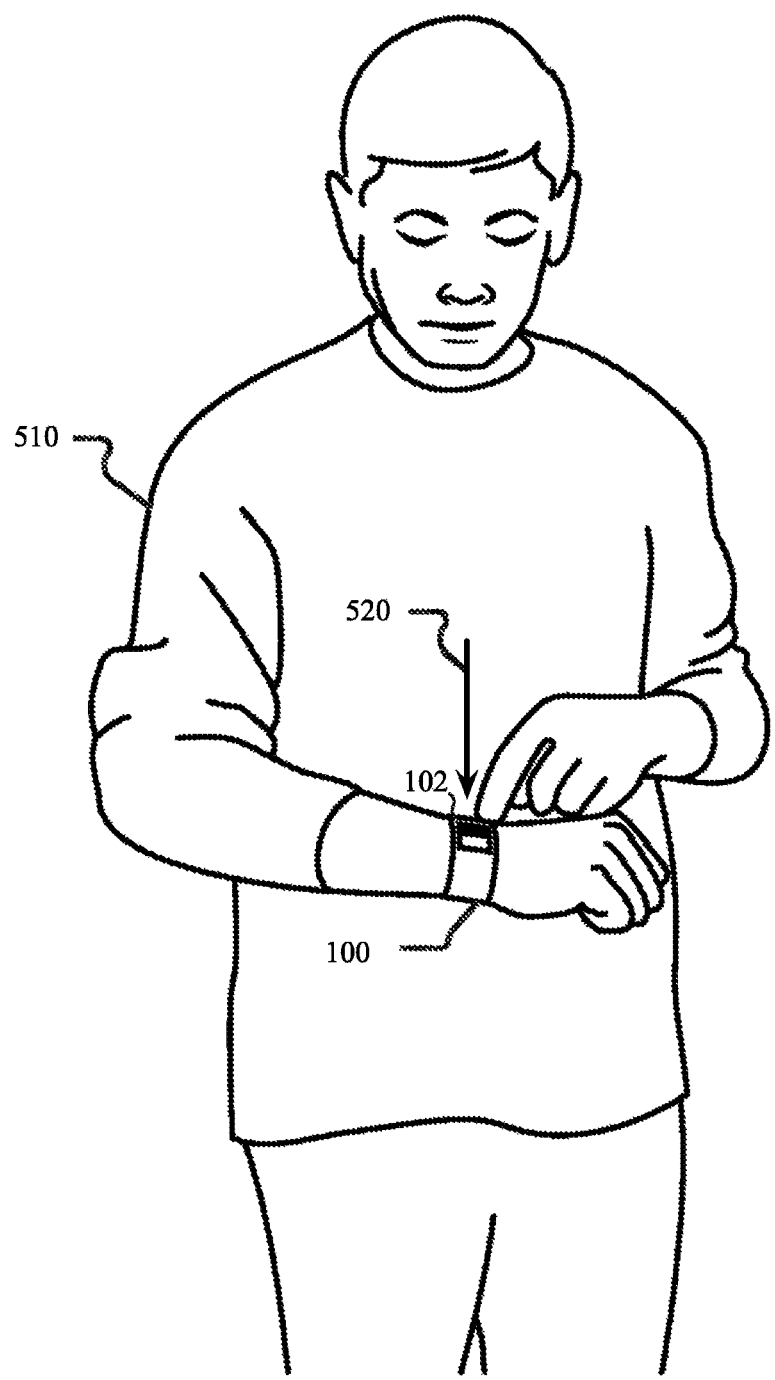
FIG. 5A-5B illustrates wearable electronic device positions associated with active and inactive states.
Figure 5B:
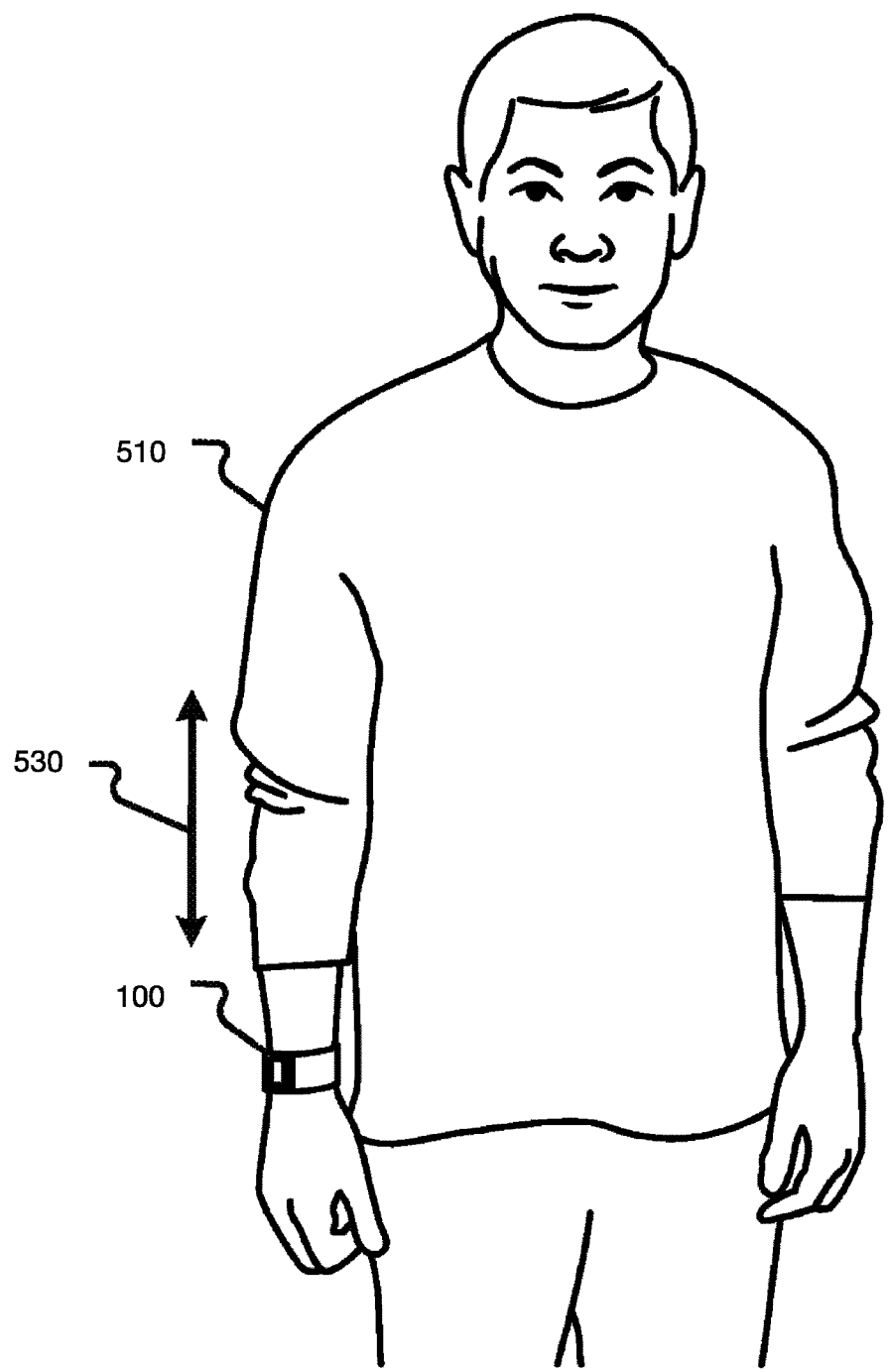

FIGS. 5A-5B illustrates wearable electronic device positions associated with screen-on and screen-off states. FIG. 5A illustrates a wearable electronic device 100 in an active state, screen-on state. FIG. 5B illustrates the wearable electronic device 100 in a screen-off state. While in the screen-off state, the wearable electronic device 100 may be in an inactive or low-power state in which application execution is limited or may periodically enter an active state in which at least the front-most application can continue executing for a period of time.

For example, as illustrated in FIG. 5A, a user 510 can interact 520 with the display 102 of the wearable electronic device 100. The wearable electronic device 100 can determine a transition to a wrist-up state via the set of sensors within the device and activate the display 102 in response to the transition. The wearable electronic device 100 can then receive input from the user 510 and the input can be relayed to a front-most application that is displayed on the device. In one embodiment the user 510 can initiate an application that may be active for a period of time after the user is not directly interacting with the application. For example, the user 510 can begin a ride-sharing session by requesting a ride-sharing vehicle to be sent to the current location of the user. After the request, the ride-sharing application can begin to download data over a remote data link to facilitate the ride-sharing session.

As shown in FIG. 5B, after initiating the ride-sharing session or performing another interactive activity on the wearable electronic device 100, the user 510 can lower their wrist (530) or perform another gesture or activity which transitions the wearable electronic device 100 into the screen-off. In general, when the wearable electronic device 100 is transitioned to the screen-off state, applications execution on the device can be restricted to reduce device power consumption. The application execution restriction can include limiting the amount of time a given application can execute on a processor of the wearable electronic device 100 and limiting the amount of data that may be transferred by an application.

In embodiments described herein, should the user lower their wrist after initiating an activity request via an application, such as requesting a ride via a ride-sharing application, tasks associated with the front-most application can be allowed additional time to execute or transfer data after the device is transitioned to the screen-off state. Additionally, any tasks associated with the front-most application can be given an elevated priority to better enable completion of those activities after the wearable electronic device 100 is sent into a screen-off state. The elevated priority and execution time granted to the front-most application allows forward progress for tasks initiated by the user to continue while the device is in the screen-off state, potentially allowing those tasks to be completed before the user's next glance at or activation of the wearable electronic device 100.

Figure 6A:
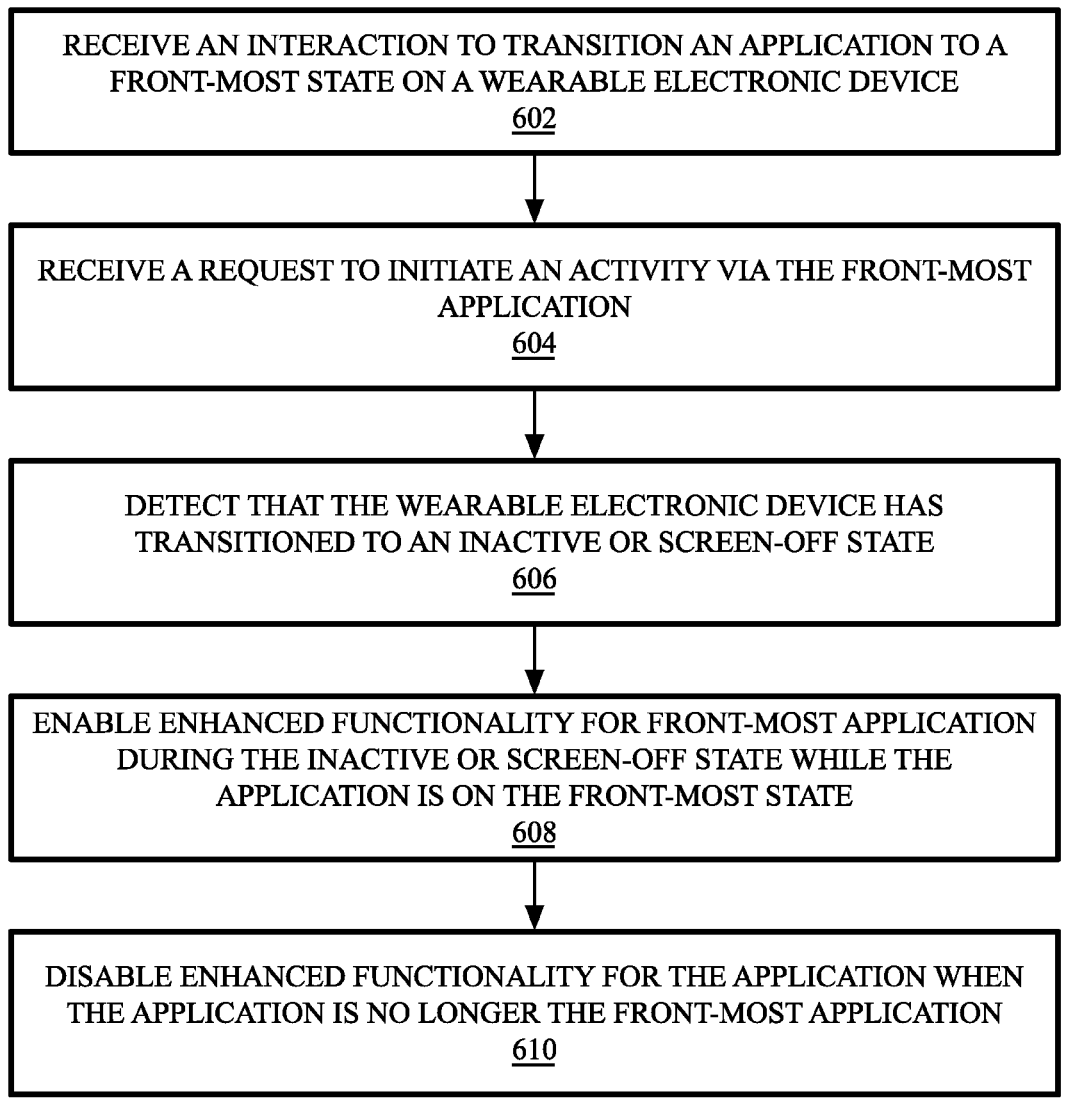
FIG. 6A-6C illustrate operations for application management logic for a wearable electronic device according to embodiments described herein.
Figure 6B:
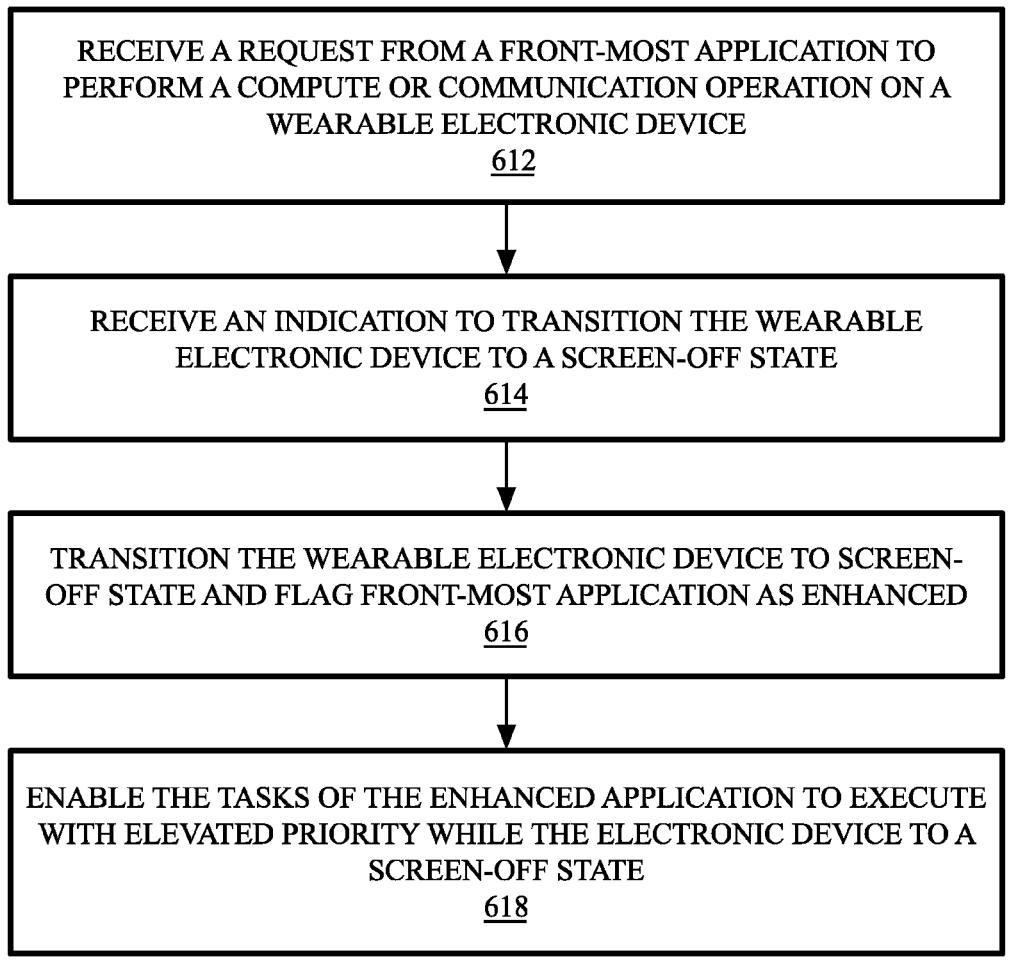
Figure 6C:
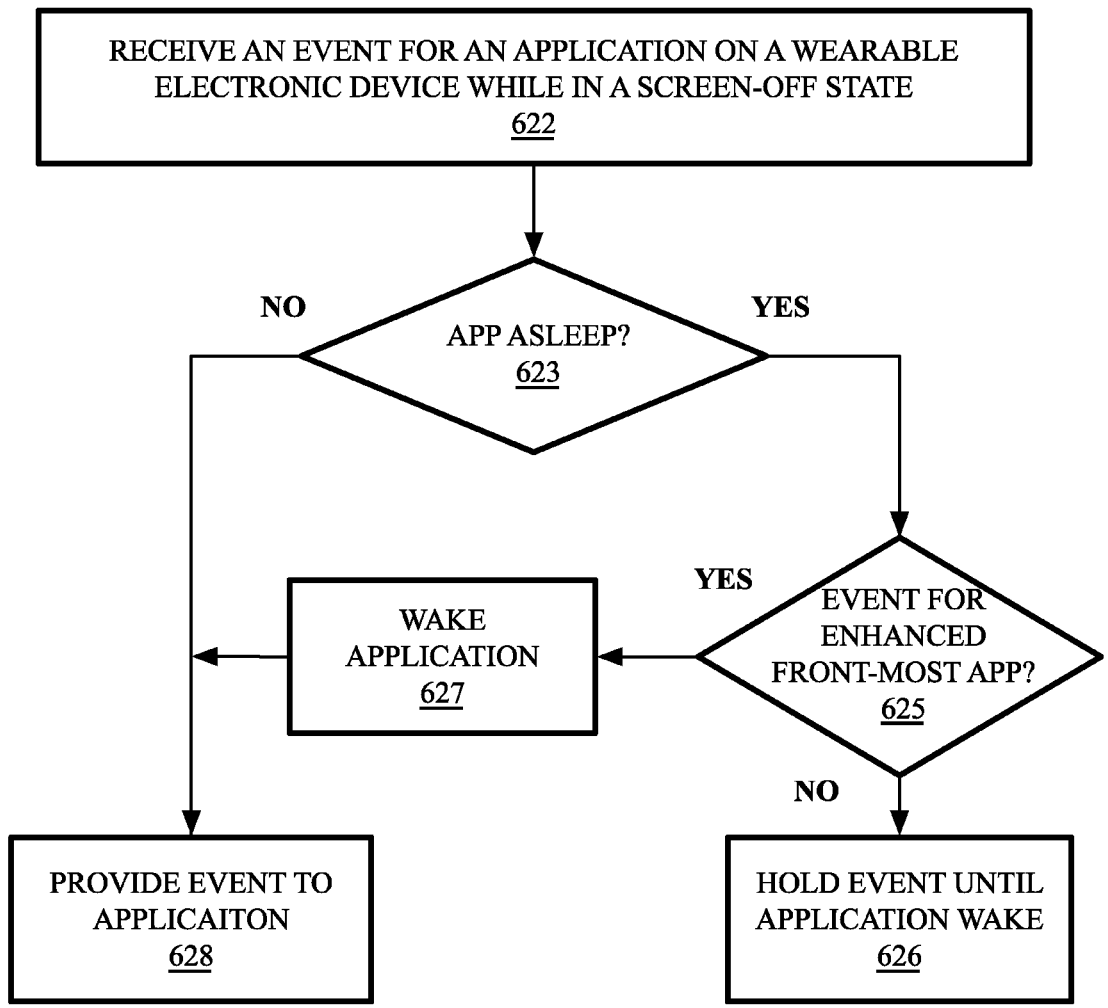

FIG. 6A-6C illustrate operations for application management logic 600 for a wearable electronic device according to embodiments described herein. The application management logic 600 can be implemented via system software on a wearable electronic device 100 as described herein. FIG. 6A illustrates a flow diagram illustrating operations performed by the application management logic 600 to enhance functionality for an application while the application is in the front-most state. FIG. 6B is a flow diagram illustrating operations performed by the application management logic 600 that provides enhanced functionality for enhanced-front most applications. FIG. 6C illustrates operations performed by the application management logic 600 to manage event handling for an enhanced front-most application.

As shown in FIG. 6A, the logic 600 can receive an indication to transition an application to a front-most state on a wearable electronic device, as shown at block 602. In one embodiment the indication can be that an application has been flagged as sticky and that the sticky application will be presented as the front-most application at the next device activation. An application can also be made front-most due to an action perform on a companion application executing on mobile electronic device 130 or relayed from a computing device 230 through the mobile electronic device 130. The logic 600 can then detect that the wearable electronic device is in an inactive or screen-off state at block 606. In response, the logic 600 can throttle execution of tasks other than those performed or initiated by the front-most application and, as shown at block 608, enable enhanced functionality for the front-most application during the inactive or screen-off state. Enabling enhanced functionality for the front-most application can include increasing an execution priority associated with the application, increasing processor execution time allotted to the front-most application, or limiting the degree of data or execution throttling applied to the enhanced front-most application relative to other applications executing on the wearable electronic device.

The application is classified as an enhanced front-most application while the wearable electronic device is in a screen-off state and the next time the user raises their wrist to activate the wearable electronic device, the application will be displayed to the user. The enhanced functionality enabled for the front-most application can vary according to embodiments. Should the application become not front-most, the logic 600 can disable the enhanced functionality for the application when the application is no longer the front-most application, as shown at block 610. In one embodiment, a given application may be maintained as a front-most application for a limited period before a different application, such as different, default application (e.g., watch face, etc.) becomes front-most. However, for certain ongoing activities that the user may expect to be completed the next time the user looks at the wearable electronic device, in one embodiment some tasks initiated by an enhanced front-most application may still be allowed to execute for at least a period of time even after the front-most application has been transitioned to a background or not-front most state, particularly if the application is expected to again become front-most by the time the user next activates the wearable electronic device.

As shown in FIG. 6B, one embodiment the logic 600 can receive a request via front-most application to perform a compute or communication operation on a wearable electronic device, as shown at block 612. At block 614 the logic 600 can also receive an indication to transition the wearable electronic device to a screen-off state, for example, in response to the user lowering their wrist in the case of an electronic watch device, as illustrated in FIG. 5B. In response to the indication at block 614, the logic 600 can transition the wearable electronic device to screen-off state and flag front-most application as enhanced, as shown at block 616. The logic 600 can then enable the tasks of the enhanced application to execute with elevated priority while the electronic device to a screen-off state, as shown at block 618. Enabling the tasks to of the enhanced front-most application to execute at elevated priority while in the screen-off state allows the application that will be front-most at the next activation to complete tasks that the user may expect to be completed when the user next views the wearable electronic device. For example, a user can initiate an activity while an application is in the foreground state and the wearable electronic device is in an active (e.g., screen-on) state and then send the wearable electronic device into a low power (e.g., screen-off) state, this runtime priority of tasks associated with the initiated activity can be increased to allow the application to complete the initiated process while the wearable electronic device is in the low power state.

As shown in FIG. 6C, in one embodiment logic 600 can receive an event for an application on a wearable electronic device while the device is in a screen-off state, as shown at block 622. The logic 600 can then determine if the application is in a sleep state at block 623. If the application is not in a sleep state, the logic 600 can provide the event to the application at block 628. If the application is asleep at block 623, the logic 600 can determine if the event is for an enhanced front-most application at block 625. If the event is not for an enhanced front-most application at block 625, the logic 600 can hold the event until the application is next awake at block 626, which may happen when the wearable electronic device next transitions to a screen-on state. If the event is for an enhanced front-most application at block 625, the logic 600 can wake the application at block 627 before providing the event to the application at block 628.

In one embodiment the event provided to the application may be a notification event. One embodiment enables front-most applications to determine the method of notification to provide to users while in both the screen on and screen off state. In one implementation of wearable electronic device, a notification interface is provided in which all incoming notifications (e.g., push notifications, etc.) are presented to the user. Embodiments described herein can provide notification data that is relevant to the current front-most application to the application itself, which can determine the method to use to notify the user. Upon receipt of the notification, the application can determine to display the notification via an in-app method, via the standard notification mechanism, via an audio notification, or via a haptic notification.

In some embodiments certain notifications are enabled an application while the application is in a background state. In one embodiment an application can play a haptic feedback notification from the background. In one embodiment an application can wake from the background to receive an incoming notification if the application is in the background state when the notification is received. In one embodiment a background application can wake immediately upon completion of a previously initiated background transfer.

For example, when a front-most app receives a notification, rather than displaying a notification alert via the standard notification system, the application can play haptic feedback or a custom sound and then update the user interface of the application. As mentioned previously, in some instances an application can receive an increased runtime priority when attempting to complete some activities in the background, particularly if those activities are associated with actions initiated while the application or the wearable electronic device is in an active state.

Using the stickiness system and the enhanced application system, certain applications, such as a workout application, location based applications, and audio-recording applications, can appear to behave similarly to the front-most application on the wearable electronic device. These applications can continue to run in the background throughout the entire workout, location, or recording session.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services. In another example, users can select not to provide location information for targeted content delivery services. In yet another example, users can select to not provide precise location information, but permit the transfer of location zone information.

Embodiments described herein include one or more application programming interfaces (APIs) in an environment in which calling program code interacts with other program code that is called through one or more programming interfaces. Various function calls, messages, or other types of invocations, which further may include various kinds of parameters, can be transferred via the APIs between the calling program and the code being called. In addition, an API may provide the calling program code the ability to use data types or classes defined in the API and implemented in the called program code.

An API allows a developer of an API-calling component (which may be a third party developer) to leverage specified features provided by an API-implementing component. There may be one API-calling component or there may be more than one such component. An API can be a source code interface that a computer system or program library provides in order to support requests for services from an application. An operating system (OS) can have multiple APIs to allow applications running on the OS to call one or more of those APIs, and a service (such as a program library) can have multiple APIs to allow an application that uses the service to call one or more of those APIs. An API can be specified in terms of a programming language that can be interpreted or compiled when an application is built.

In some embodiments the API-implementing component may provide more than one API, each providing a different view of or with different aspects that access different aspects of the functionality implemented by the API-implementing component. For example, one API of an API-implementing component can provide a first set of functions and can be exposed to third party developers, and another API of the API-implementing component can be hidden (not exposed) and provide a subset of the first set of functions and also provide another set of functions, such as testing or debugging functions which are not in the first set of functions. In other embodiments the API-implementing component may itself call one or more other components via an underlying API and thus be both an API-calling component and an API-implementing component.

An API defines the language and parameters that API-calling components use when accessing and using specified features of the API-implementing component. For example, an API-calling component accesses the specified features of the API-implementing component through one or more API calls or invocations (embodied for example by function or method calls) exposed by the API and passes data and control information using parameters via the API calls or invocations. The API-implementing component may return a value through the API in response to an API call from an API-calling component. While the API defines the syntax and result of an API call (e.g., how to invoke the API call and what the API call does), the API may not reveal how the API call accomplishes the function specified by the API call. Various API calls are transferred via the one or more application programming interfaces between the calling (API-calling component) and an API-implementing component. Transferring the API calls may include issuing, initiating, invoking, calling, receiving, returning, or responding to the function calls or messages; in other words, transferring can describe actions by either of the API-calling component or the API-implementing component. The function calls or other invocations of the API may send or receive one or more parameters through a parameter list or other structure. A parameter can be a constant, key, data structure, object, object class, variable, data type, pointer, array, list or a pointer to a function or method or another way to reference a data or other item to be passed via the API.

Furthermore, data types or classes may be provided by the API and implemented by the API-implementing component. Thus, the API-calling component may declare variables, use pointers to, use or instantiate constant values of such types or classes by using definitions provided in the API.

Generally, an API can be used to access a service or data provided by the API-implementing component or to initiate performance of an operation or computation provided by the API-implementing component. By way of example, the API-implementing component and the API-calling component may each be any one of an operating system, a library, a device driver, an API, an application program, or other module (it should be understood that the API-implementing component and the API-calling component may be the same or different type of module from each other). API-implementing components may in some cases be embodied at least in part in firmware, microcode, or other hardware logic. In some embodiments, an API may allow a client program to use the services provided by a Software Development Kit (SDK) library. In other embodiments an application or other client program may use an API provided by an Application Framework. In these embodiments the application or client program may incorporate calls to functions or methods provided by the SDK and provided by the API or use data types or objects defined in the SDK and provided by the API. An Application Framework may in these embodiments provide a main event loop for a program that responds to various events defined by the Framework. The API allows the application to specify the events and the responses to the events using the Application Framework. In some implementations, an API call can report to an application the capabilities or state of a hardware device, including those related to aspects such as input capabilities and state, output capabilities and state, processing capability, power state, storage capacity and state, communications capability, etc., and the API may be implemented in part by firmware, microcode, or other low level logic that executes in part on the hardware component.

The API-calling component may be a local component (i.e., on the same data processing system as the API-implementing component) or a remote component (i.e., on a different data processing system from the API-implementing component) that communicates with the API-implementing component through the API over a network. It should be understood that an API-implementing component may also act as an API-calling component (i.e., it may make API calls to an API exposed by a different API-implementing component) and an API-calling component may also act as an API-implementing component by implementing an API that is exposed to a different API-calling component.

The API may allow multiple API-calling components written in different programming languages to communicate with the API-implementing component (thus the API may include features for translating calls and returns between the API-implementing component and the API-calling component); however the API may be implemented in terms of a specific programming language. An API-calling component can, in one embedment, call APIs from different providers such as a set of APIs from an OS provider and another set of APIs from a plug-in provider and another set of APIs from another provider (e.g. the provider of a software library) or creator of the another set of APIs.

Figure 7:
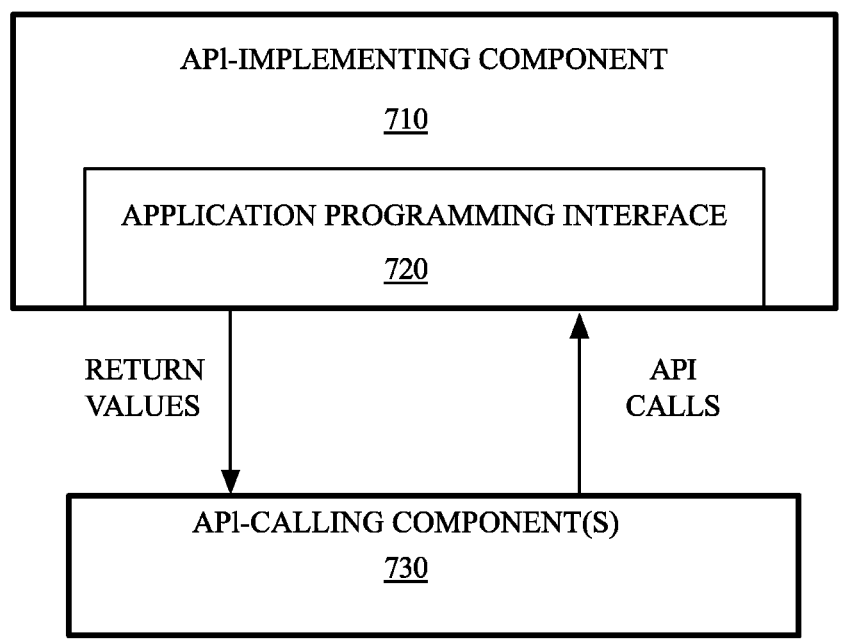
FIG. 7 is a block diagram illustrating an exemplary API architecture, which may be used in some embodiments of the invention.

FIG. 7 is a block diagram illustrating an exemplary API architecture, which may be used in some embodiments of the invention. As shown in FIG. 7, the API architecture 700 includes the API-implementing component 710 (e.g., an operating system, a library, a device driver, an API, an application program, software or other module) that implements the API 720. The API 720 specifies one or more functions, methods, classes, objects, protocols, data structures, formats and/or other features of the API-implementing component that may be used by the API-calling component 730. The API 720 can specify at least one calling convention that specifies how a function in the API-implementing component receives parameters from the API-calling component and how the function returns a result to the API-calling component. The API-calling component 730 (e.g., an operating system, a library, a device driver, an API, an application program, software or other module), makes API calls through the API 720 to access and use the features of the API-implementing component 710 that are specified by the API 720. The API-implementing component 710 may return a value through the API 720 to the API-calling component 730 in response to an API call.

It will be appreciated that the API-implementing component 710 may include additional functions, methods, classes, data structures, and/or other features that are not specified through the API 720 and are not available to the API-calling component 730. It should be understood that the API-calling component 730 may be on the same system as the API-implementing component 710 or may be located remotely and accesses the API-implementing component 710 using the API 720 over a network. While FIG. 7 illustrates a single API-calling component 730 interacting with the API 720, it should be understood that other API-calling components, which may be written in different languages (or the same language) than the API-calling component 730, may use the API 720.

The API-implementing component 710, the API 720, and the API-calling component 730 may be stored in a machine-readable medium, which includes any mechanism for storing information in a form readable by a machine (e.g., a computer or other data processing system). For example, a machine-readable medium includes magnetic disks, optical disks, random access memory; read only memory, flash memory devices, etc.

Figure 8A:
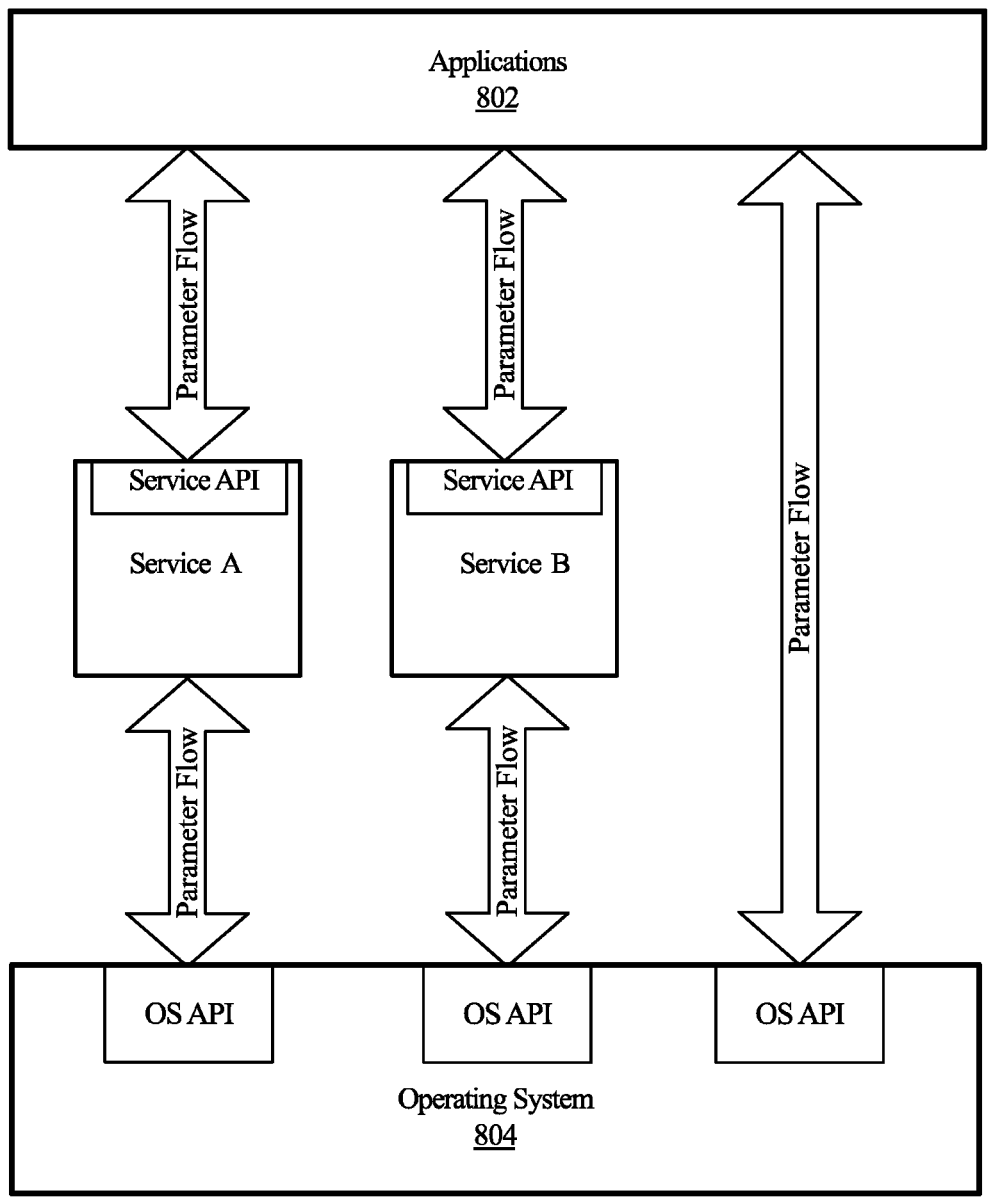
FIG. 8A-B are block diagrams of exemplary API software stacks, according to embodiments.
Figure 8B:
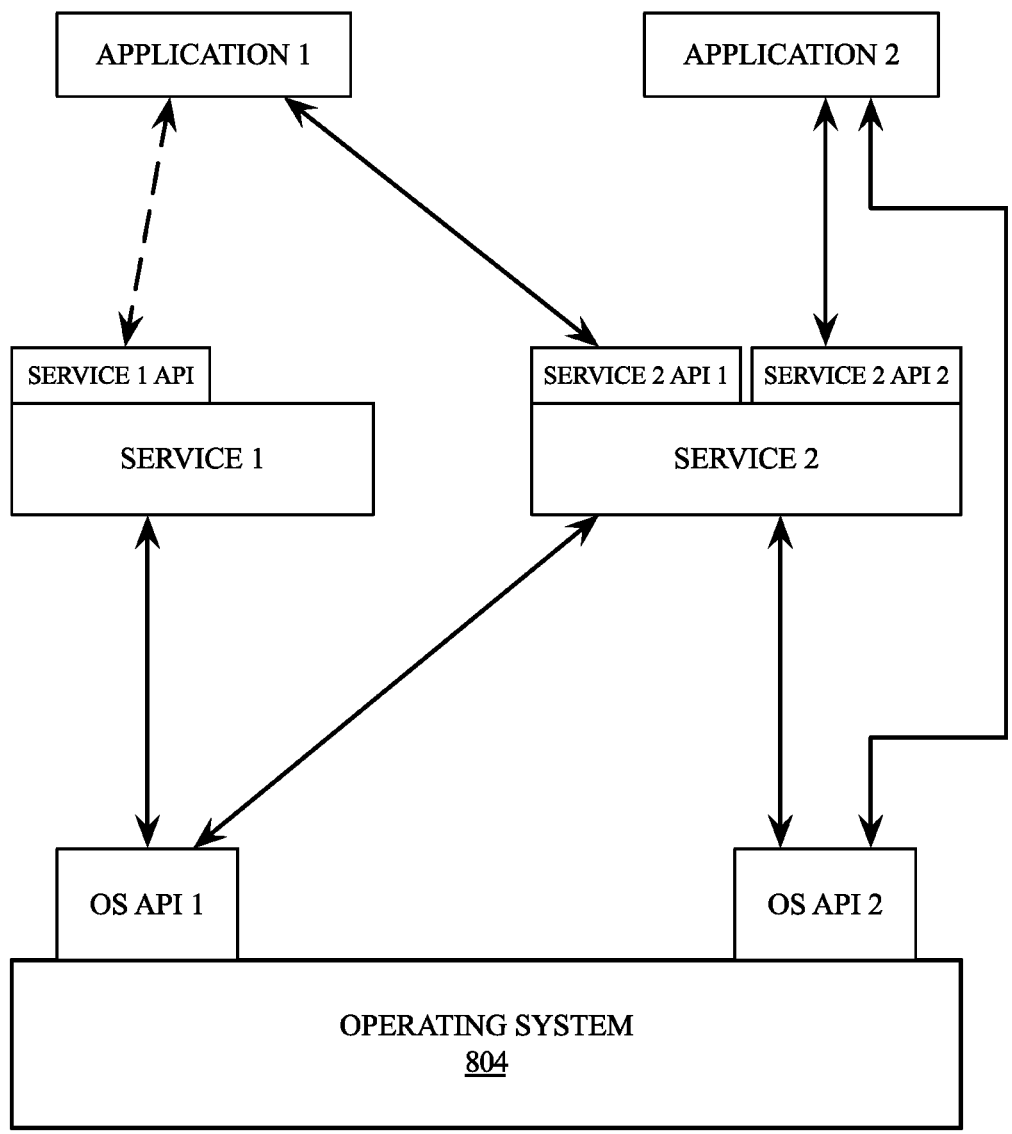

FIG. 8A-8B are block diagrams of exemplary API software stacks 800, 810, according to embodiments. FIG. 8A shows an exemplary API software stack 800 in which applications 802 can make calls to Service A or Service B using Service API and to Operating System 804 using an OS API. Additionally, Service A and Service B can make calls to Operating System 804 using several OS APIs.

FIG. 8B shows an exemplary API software stack 810 including Application 1, Application 2, Service 1, Service 2, and Operating System 804. As illustrated, Service 2 has two APIs, one of which (Service 2 API 1) receives calls from and returns values to Application 1 and the other (Service 2 API 2) receives calls from and returns values to Application 2. Service 1 (which can be, for example, a software library) makes calls to and receives returned values from OS API 1, and Service 2 (which can be, for example, a software library) makes calls to and receives returned values from both OS API 1 and OS API 2. Application 2 makes calls to and receives returned values from OS API 2.

Figure 9:
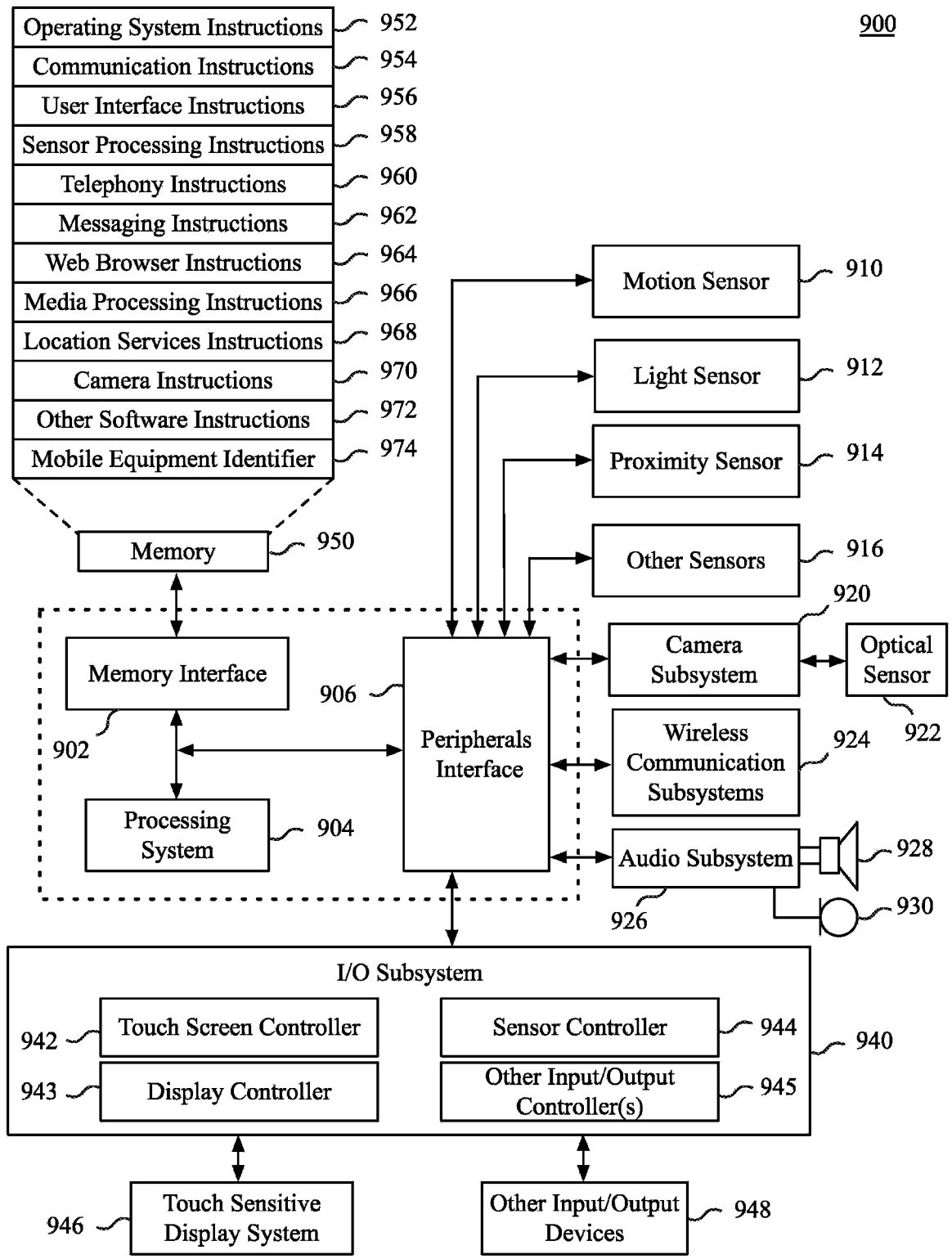
FIG. 9 is a block diagram of mobile device architecture, according to an embodiment.

FIG. 9 is a block diagram of mobile device architecture 900, according to an embodiment. The mobile device architecture 900 includes a memory interface 902, a processing system 904 including one or more data processors, image processors and/or graphics processing units, and a peripherals interface 906. The various components can be coupled by one or more communication buses or signal lines. The various components can be separate logical components or devices or can be integrated in one or more integrated circuits, such as in a system on a chip integrated circuit.

The memory interface 902 can be coupled to memory 950, which can include high-speed random access memory such as static random access memory (SRAM) or dynamic random access memory (DRAM) and/or non-volatile memory, such as but not limited to flash memory (e.g., NAND flash, NOR flash, etc.).

Sensors, devices, and subsystems can be coupled to the peripherals interface 906 to facilitate multiple functionalities. For example, a motion sensor 910, a light sensor 912, and a proximity sensor 914 can be coupled to the peripherals interface 906 to facilitate the mobile device functionality. Other sensors 916 can also be connected to the peripherals interface 906, such as a positioning system (e.g., GPS receiver), a temperature sensor, a biometric sensor, or other sensing device, to facilitate related functionalities. A camera subsystem 920 and an optical sensor 922, e.g., a charged coupled device (CCD) or a complementary metal-oxide semiconductor (CMOS) optical sensor, can be utilized to facilitate camera functions, such as recording photographs and video clips.

Communication functions can be facilitated through one or more wireless communication subsystems 924, which can include radio frequency receivers and transmitters and/or optical (e.g., infrared) receivers and transmitters. The specific design and implementation of the communication subsystems 924 can depend on the communication network(s) over which a mobile device is intended to operate. For example, a mobile device including the illustrated mobile device architecture 900 can include wireless communication subsystems 924 designed to operate over a GSM network, a CDMA network, an LTE network, a Wi-Fi network, a Bluetooth® network, or any other wireless network. In particular, the wireless communication subsystems 924 can provide a communications mechanism over which a client browser application can retrieve resources from a remote web server.

An audio subsystem 926 can be coupled to a speaker 928 and a microphone 930 to facilitate voice-enabled functions, such as voice recognition, voice replication, digital recording, and telephony functions.

The I/O subsystem 940 can include a touch screen controller 942 and/or other input controller(s) 945. The touch screen controller 942 can be coupled to a touch sensitive display system 946 (e.g., touch-screen). The touch sensitive display system 946 and touch screen controller 942 can, for example, detect contact and movement and/or pressure using any of a plurality of touch and pressure sensing technologies, including but not limited to capacitive, resistive, infrared, and surface acoustic wave technologies, as well as other proximity sensor arrays or other elements for determining one or more points of contact with a touch sensitive display system 946. Display output for the touch sensitive display system 946 can be generated by a display controller 943. In one embodiment the display controller 943 can provide frame data to the touch sensitive display system 946 at a variable frame rate.

In one embodiment a sensor controller 944 is included to monitor, control, and/or processes data received from one or more of the motion sensor 910, light sensor 912, proximity sensor 914, or other sensors 916. The sensor controller 944 can include logic to interpret sensor data to determine the occurrence of one of more motion events or activities by analysis of the sensor data from the sensors.

In one embodiment the I/O subsystem 940 includes other input controller(s) 945 that can be coupled to other input/ control devices 948, such as one or more buttons, rocker switches, thumb-wheel, infrared port, USB port, and/or a pointer device such as a stylus, or control devices such as an up/down button for volume control of the speaker 928 and/or the microphone 930.

In one embodiment, the memory 950 coupled to the memory interface 902 can store instructions for an operating system 952, including portable operating system interface (POSIX) compliant and non-compliant operating system or an embedded operating system. The operating system 952 may include instructions for handling basic system services and for performing hardware dependent tasks. In some implementations, the operating system 952 can be a kernel.

The memory 950 can also store communication instructions 954 to facilitate communicating with one or more additional devices, one or more computers and/or one or more servers, for example, to retrieve web resources from remote web servers. The memory 950 can also include user interface instructions 956, including graphical user interface instructions to facilitate graphic user interface processing.

Additionally, the memory 950 can store sensor processing instructions 958 to facilitate sensor-related processing and functions; telephony instructions 960 to facilitate telephone-related processes and functions; messaging instructions 962 to facilitate electronic-messaging related processes and functions; web browser instructions 964 to facilitate web browsing-related processes and functions; media processing instructions 966 to facilitate media processing-related processes and functions; location services instructions including GPS and/or navigation instructions 968 and Wi-Fi based location instructions to facilitate location based functionality; camera instructions 970 to facilitate camera-related processes and functions; and/or other software instructions 972 to facilitate other processes and functions, e.g., security processes and functions, and processes and functions related to the systems. The memory 950 may also store other software instructions such as web video instructions to facilitate web video-related processes and functions; and/or web shopping instructions to facilitate web shopping-related processes and functions. In some implementations, the media processing instructions 966 are divided into audio processing instructions and video processing instructions to facilitate audio processing-related processes and functions and video processing-related processes and functions, respectively. A mobile equipment identifier, such as an International Mobile Equipment Identity (IMEI) 974 or a similar hardware identifier can also be stored in memory 950.

Each of the above identified instructions and applications can correspond to a set of instructions for performing one or more functions described above. These instructions need not be implemented as separate software programs, procedures, or modules. The memory 950 can include additional instructions or fewer instructions. Furthermore, various functions may be implemented in hardware and/or in software, including in one or more signal processing and/or application specific integrated circuits.

Figure 10:
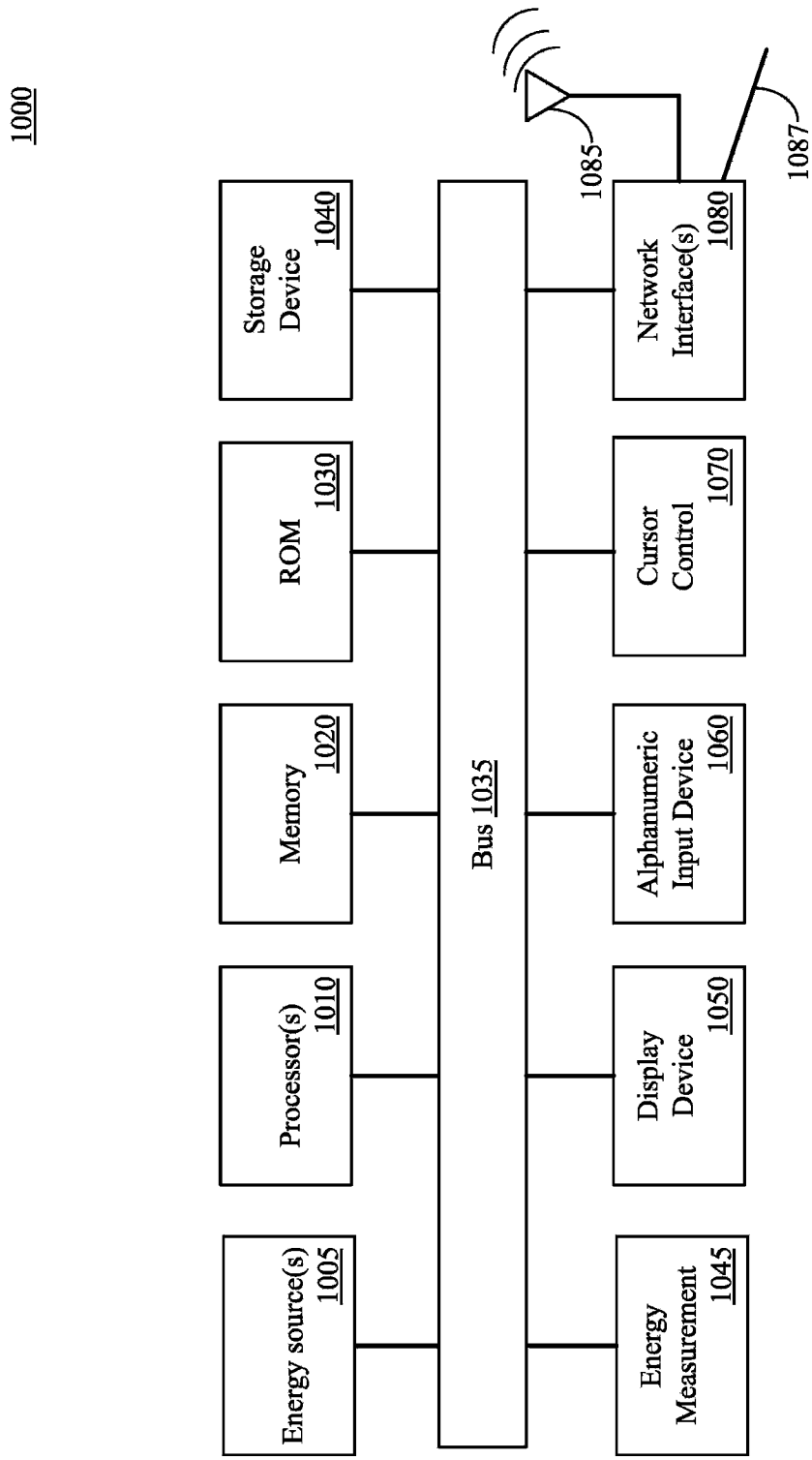
FIG. 10 is a block diagram of one embodiment of a computing system.

FIG. 10 is a block diagram of one embodiment of a computing system 1000. The computing system illustrated in FIG. 10 is intended to represent a range of computing systems (either wired or wireless) including, for example, desktop computer systems, laptop computer systems, tablet computer systems, cellular telephones, personal digital assistants (PDAs) including cellular-enabled PDAs, set top boxes, entertainment systems or other consumer electronic devices. Alternative computing systems may include more, fewer and/or different components. The computing system of FIG. 10 may be used to provide the computing device and/or the server device.

Computing system 1000 includes bus 1035 or other communication device to communicate information, and processor(s) 1010 coupled to bus 1035 that may process information.

While computing system 1000 is illustrated with a single processor, computing system 1000 may include multiple processors and/or co-processors 1010. Computing system 1000 further may include random access memory (RAM) or other dynamic storage device (e.g., main memory 1020), coupled to bus 1035 and may store information and instructions that may be executed by processor(s) 1010. Main memory 1020 may also be used to store temporary variables or other intermediate information during execution of instructions by processor(s) 1010.

Computing system 1000 may also include read only memory (ROM) 1030 and/or another data storage device 1040 coupled to bus 1035 that may store information and instructions for processor(s) 1010. Data storage device 1040 may be coupled to bus 1035 to store information and instructions. Data storage device 1040 such as flash memory or a magnetic disk or optical disc and corresponding drive may be coupled to computing system 1000.

Computing system 1000 may also be coupled via bus 1035 to display device 1050 to display information to a user. Computing system 1000 can also include an alphanumeric input device 1060, including alphanumeric and other keys, which may be coupled to bus 1035 to communicate information and command selections to processor(s) 1010. Another type of user input device is cursor control 1070, such as a touchpad, a mouse, a trackball, or cursor direction keys to communicate direction information and command selections to processor(s) 1010 and to control cursor movement on display device 1050. Computing system 1000 may also receive user input from a remote device that is communicatively coupled to computing system 1000 via one or more network interface(s) 1080.

Computing system 1000 further may include one or more network interface(s) 1080 to provide access to a network, such as a local area network. Network interface(s) 1080 may include, for example, a wireless network interface having antenna 1085, which may represent one or more antenna(e). Computing system 1000 can include multiple wireless network interfaces such as a combination of Wi-Fi, Bluetooth®, near field communication (NFC), and/or cellular telephony interfaces. Network interface(s) 1080 may also include, for example, a wired network interface to communicate with remote devices via network cable 1087, which may be, for example, an Ethernet cable, a coaxial cable, a fiber optic cable, a serial cable, or a parallel cable.

In one embodiment, network interface(s) 1080 may provide access to a local area network, for example, by conforming to IEEE 802.11b and/or IEEE 802.11g standards, and/or the wireless network interface may provide access to a personal area network, for example, by conforming to Bluetooth® standards. Other wireless network interfaces and/or protocols can also be supported. In addition to, or instead of, communication via wireless LAN standards, network interface(s) 1080 may provide wireless communications using, for example, Time Division, Multiple Access (TDMA) protocols, Global System for Mobile Communications (GSM) protocols, Code Division, Multiple Access (CDMA) protocols, Long Term Evolution (LTE) protocols, and/or any other type of wireless communications protocol.

Computing system 1000 can further include one or more energy sources 1005 and one or more energy measurement systems 1045. Energy sources 1005 can include an AC/DC adapter coupled to an external power source, one or more batteries, one or more charge storage devices, a USB charger, or other energy source. Energy measurement systems include at least one voltage or amperage measuring device that can measure energy consumed by the computing system 1000 during a predetermined period of time. Additionally, one or more energy measurement systems can be included that measure, e.g., energy consumed by a display device, cooling subsystem, Wi-Fi subsystem, or other frequently used or high-energy consumption subsystem.

In the foregoing specification, the invention has been described with reference to specific embodiments thereof. It will, however, be evident that various modifications and changes can be made thereto without departing from the broader spirit and scope of the invention. The specification and drawings are, accordingly, to be regarded in an illustrative rather than a restrictive sense. The specifics in the descriptions and examples provided may be used anywhere in one or more embodiments. The various features of the different embodiments or examples may be variously combined with some features included and others excluded to suit a variety of different applications. Examples may include subject matter such as a method, means for performing acts of the method, at least one machine-readable medium including instructions that, when performed by a machine cause the machine to performs acts of the method, or of an apparatus or system according to embodiments and examples described herein. Additionally various components described herein can be a means for performing the operations or functions described in accordance with an embodiment.

Embodiments described herein provide for a method of determining application display persistence on a wearable electronic device, the method comprising receiving an application programming interface (API) call from an application to perform an action on the wearable electronic device; beginning a session on the wearable electronic device in response to determining that the API call is associated with the beginning of a session; determining, based on the application, a persistence level to apply to the application; flagging the application associated with the session as persistent; and displaying a persistent application at the next activation of the wearable electronic device in place of a default application associated with the wearable electronic device.

One embodiment provides for a non-transitory machine readable medium storing instructions which, when executed by one or more processors of a wearable electronic device, cause the wearable electronic device to perform operations including receiving an interaction to transition an application to a front-most state on the wearable electronic device; receiving a request to initiate an activity via the front-most application; detecting that the wearable electronic device has transitioned to an inactive or screen-off state; and enabling enhanced functionality for the front-most application during the inactive or screen off state while the application is in the front-most state.

One embodiment provides for a data processing system on a wearable electronic device, the data processing system comprising one or more processors and a non-transitory machine-readable medium storing a set of instructions for execution by the one or more processors. The instructions can be configured to cause the one or more processors to receive a first application programming interface (API) call from an application to perform a first action on the wearable electronic device; begin a session on the wearable electronic device in response to a first determination that the first API call is associated with the beginning of a session; determine, based on the application, a persistence level to apply to the application; flag the application associated with the session as persistent; and display a persistent application at the next activation of the wearable electronic device in place of a default application associated with the wearable electronic device.

Other features of the present embodiments will be apparent from the accompanying drawings and from the detailed description above. Accordingly, the true scope of the embodiments will become apparent to the skilled practitioner upon a study of the drawings, specification, and following claims.

What is claimed is:
1. A wearable electronic device comprising:
    a display device;
    a memory device; and
    one or more processors to execute instructions stored in the memory device, wherein the instructions cause the one or more processors to:

receive an interaction to transition an application to a front-most state on the wearable electronic device;

receive a request to initiate an activity via the application in the front-most state;

detect that the wearable electronic device has transitioned to a low power mode; and increase an execution priority for the application in the front-most state in response to a transition to the low power mode and while the application is in the front-most state.

2. The wearable electronic device as in claim 1, wherein the instructions further cause the one or more processors to enable enhanced functionality for the application in response to a transition to the low power mode and while the application is in the front-most state, wherein the application is a persistent application having a display persistence level and the enhanced functionality for the persistent application is enabled according to the display persistence level.

3. The wearable electronic device as in claim 1, wherein the instructions further cause the one or more processors to enable enhanced functionality for the application in response to a transition to the low power mode and while the application is in the front-most state, wherein to enable the enhanced functionality for the application in the front-most state includes to increase processor execution time allotted to the application in the front-most state.

4. The wearable electronic device as in claim 1, wherein the instructions further cause the one or more processors to enable enhanced functionality for the application in response to a transition to the low power mode and while the application is in the front-most state, wherein to enable the enhanced functionality for the application in the front-most state includes to reduce resource access throttling for the application in the front-most state relative to other applications on the wearable electronic device.

5. The wearable electronic device as in claim 4, wherein to reduce resource access throttling for the application in the front-most state includes to increase access to network resources relative to other applications on the wearable electronic device.

6. The wearable electronic device as in claim 1, wherein the instructions further cause the one or more processors to enable enhanced functionality for the application in response to a transition to the low power mode and while the application is in the front-most state, wherein to enable the enhanced functionality for the application in the front-most state includes to wake the application from a sleep or idle state in response to receipt of an external event for the application.

7. The wearable electronic device as in claim 1, wherein the instructions further cause the one or more processors to:

enable enhanced functionality for the application in response to a transition to the low power mode and while the application is in the front-most state; and disable the enhanced functionality for the application when the application is no-longer in the front-most state.

8. A method performed by a wearable electronic device, the method comprising:

receiving an interaction to transition an application to a front-most state on the wearable electronic device;

receiving a request to initiate an activity via the application in the front-most state;

detecting that the wearable electronic device has transitioned to a low power mode; and increasing execution priority for the application in the front-most state in response to a transition to the low power mode and while the application is in the front-most state.

9. The method as in claim 8, further comprising enabling enhanced functionality for the application in response to a transition to the low power mode and while the application is in the front-most state, wherein the application is a persistent application having a display persistence level and the enhanced functionality for the persistent application is enabled according to the display persistence level.

10. The method as in claim 8, further comprising enabling enhanced functionality for the application in response to a transition to the low power mode and while the application is in the front-most state, wherein enabling the enhanced functionality for the application in the front-most state includes increasing processor execution time allotted to the application in the front-most state.

11. The method as in claim 8, further comprising enabling enhanced functionality for the application in response to a transition to the low power mode and while the application is in the front-most state, wherein enabling the enhanced functionality for the application in the front-most state includes to reduce resource access throttling for the application in the front-most state relative to other applications on the wearable electronic device.

12. The method as in claim 11, wherein reducing resource access throttling for the application in the front-most state includes to increase access to network resources relative to other applications on the wearable electronic device.

13. The method as in claim 8, further comprising enabling enhanced functionality for the application in response to a transition to the low power mode and while the application is in the front-most state, wherein enabling the enhanced functionality for the application in the front-most state includes to wake the application from a sleep or idle state in response to receipt of an external event for the application.

14. The method as in claim 8, further comprising enabling enhanced functionality for the application in response to a transition to the low power mode and while the application is in the front-most state; and disabling the enhanced functionality for the application when the application is no-longer in the front-most state.

15. A data processing system on a wearable electronic device, the data processing system comprising:

one or more processors;

a memory to store instructions to cause the one or more processors to:

receive an interaction to transition an application to a front-most state on the wearable electronic device;

receive a request to initiate an activity via the application in the front-most state;

detect that the wearable electronic device has transitioned to a low power mode; and increase an execution priority for the application in the front-most state in response to a transition to the low power mode and while the application is in the front-most state.

16. The data processing system as in claim 15, wherein the instructions further cause the one or more processors to enable enhanced functionality for the application in response to a transition to the low power mode and while the application is in the front-most state, and
 wherein the application is a persistent application having a display persistence level and the enhanced functionality for the persistent application is enabled according to the display persistence level.

17. The data processing system as in claim 15, wherein the instructions further cause the one or more processors to enable enhanced functionality for the application in response to a transition to the low power mode and while the application is in the front-most state, and
 wherein to enable the enhanced functionality for the application in the front-most state includes to increase processor execution time allotted to the application in the front-most state or to reduce resource access throttling for the application in the front-most state relative to other applications on the wearable electronic device.

18. The data processing system as in claim 17, wherein to reduce resource access throttling for the application in the front-most state includes to increase access to network resources relative to other applications on the wearable electronic device.

19. The data processing system as in claim 15, wherein the instructions further cause the one or more processors to enable enhanced functionality for the application in response to a transition to the low power mode and while the application is in the front-most state, and
 wherein to enable the enhanced functionality for the application in the front-most state includes to wake the application from a sleep or idle state in response to receipt of an external event for the application.

20. The data processing system as in claim 15, wherein the instructions further cause the one or more processors to:
 enable enhanced functionality for the application in response to a transition to the low power mode and while the application is in the front-most state; and
 disable the enhanced functionality for the application when the application is no-longer in the front-most state.

\* \* \* \* \*